(12) United States Patent
Holzmann et al.

(10) Patent No.: US 11,773,812 B2
(45) Date of Patent: Oct. 3, 2023

(54) CURVED SEAL ON FILTER ELEMENT AND PROTECTIVE SEAL MOLD

(71) Applicant: Cummins Filtration IP, Inc., Columbus, IN (US)

(72) Inventors: Mark V. Holzmann, Stoughton, WI (US); Scott G. Manke, Sun Prairie, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 309 days.

(21) Appl. No.: 17/295,686

(22) PCT Filed: Nov. 22, 2019

(86) PCT No.: PCT/US2019/062781
§ 371 (c)(1),
(2) Date: May 20, 2021

(87) PCT Pub. No.: WO2020/112536
PCT Pub. Date: Jun. 4, 2020

(65) Prior Publication Data
US 2022/0018316 A1    Jan. 20, 2022

Related U.S. Application Data

(60) Provisional application No. 62/772,202, filed on Nov. 28, 2018.

(51) Int. Cl.
*F02M 35/024*    (2006.01)
*B01D 46/24*    (2006.01)

(52) U.S. Cl.
CPC ... *F02M 35/02408* (2013.01); *B01D 46/2414* (2013.01); *B01D 2265/022* (2013.01); *B01D 2271/022* (2013.01); *B01D 2271/025* (2013.01)

(58) Field of Classification Search
CPC ........ B01D 2271/022; B01D 2271/025; B01D 2271/027; B01D 46/2414; B01D 2265/022; F02M 35/02408; F02M 35/02483
See application file for complete search history.

(56) References Cited

U.S. PATENT DOCUMENTS 4,720,292 A    1/1988  Engel et al.
5,484,466 A    1/1996  Brown et al.
(Continued)

FOREIGN PATENT DOCUMENTS

CN    101451614    6/2009
CN    102227246    10/2011
(Continued)

OTHER PUBLICATIONS

Notice of Allowance issued for U.S. Appl. No. 17/610,110 dated Aug. 3, 2022, 31 pages.
(Continued)

*Primary Examiner* — Robert Clemente
(74) *Attorney, Agent, or Firm* — Foley & Lardner LLP

(57) ABSTRACT

A filter seal member mold includes a first mold end and a second mold end disposed axially away from the first mold end. A first mold surface is disposed between the first mold end and the second mold end and includes at least one lobe mold and at least one guide channel mold. The at least one lobe mold is configured to form at least one lobe on an end of a filter element. The at least one guide channel mold is configured to form at least one guide channel on the end of the filter element. A second mold surface is disposed between the first and second mold end and disposed radially away from the first mold surface. A mold channel is formed between a first mold surface and a second mold surface. The (Continued)

mold channel includes a closed portion and an open portion adjacent the second mold end.

25 Claims, 20 Drawing Sheets

(56) References Cited

U.S. PATENT DOCUMENTS

| | | | |
|---|---|---|---|
| 5,660,771 | A | 8/1997 | Dunfee et al. |
| 5,891,337 | A | 4/1999 | Keller et al. |
| 6,447,567 | B1 | 9/2002 | Ehrenberg |
| 6,955,701 | B2 | 10/2005 | Schrage |
| 7,122,120 | B2 | 10/2006 | Diel |
| 8,916,044 | B2 | 12/2014 | Rapin |
| 9,089,084 | B2 | 7/2015 | Ukai et al. |
| 9,636,615 | B2 | 5/2017 | Osendorf et al. |
| 9,919,254 | B2 | 3/2018 | Campbell et al. |
| 2005/0178706 | A1 | 8/2005 | Bagci et al. |
| 2006/0090434 | A1 | 5/2006 | Brown et al. |
| 2007/0289915 | A1 | 12/2007 | Jiang et al. |
| 2009/0294351 | A1 | 12/2009 | Herman et al. |
| 2009/0320424 | A1 | 12/2009 | Merritt et al. |
| 2010/0330224 | A1 | 12/2010 | Hung |
| 2013/0091812 | A1 | 4/2013 | Smith |
| 2013/0263744 | A1 | 10/2013 | Osendorf et al. |
| 2013/0305672 | A1 | 11/2013 | Adkins et al. |
| 2014/0137525 | A1* | 5/2014 | Cambpell ............. B29C 70/845 55/502 |
| 2015/0101295 | A1 | 4/2015 | Thompson et al. |
| 2015/0101298 | A1 | 4/2015 | Osendorf et al. |
| 2015/0292448 | A1* | 10/2015 | Campbell ........ F02M 35/02416 55/502 |
| 2015/0328575 | A1 | 11/2015 | Campbell et al. |
| 2016/0144310 | A1 | 5/2016 | Movia et al. |
| 2016/0325483 | A1 | 11/2016 | Langlois et al. |
| 2017/0151693 | A1 | 6/2017 | Kastner |
| 2022/0143540 | A1* | 5/2022 | Holzmann ......... B01D 46/0004 |

FOREIGN PATENT DOCUMENTS

| | | | |
|---|---|---|---|
| CN | 204172257 | | 2/2015 |
| CN | 104736216 | | 6/2015 |
| CN | 104994930 | | 10/2015 |
| CN | 205230807 | | 5/2016 |
| CN | 106142396 | | 11/2016 |
| DE | 10248907 | A1 | 4/2004 |
| DE | 10 2014 011 536 | | 2/2015 |
| EP | 0 213 930 | | 3/1987 |
| ES | 456440 | | 2/1977 |
| FR | 2288543 | | 5/1976 |
| IN | 2005KOLNP02521 | A1 | 7/2006 |
| JP | 49-100189 | | 9/1974 |
| JP | H780863 | | 3/1993 |
| JP | H732376 | | 2/1995 |
| JP | 2007-237177 | | 9/2007 |
| KR | 20150116976 | | 10/2015 |
| WO | WO-01/10532 | | 2/2001 |
| WO | WO-2013/123657 | A1 | 8/2013 |
| WO | WO-2018/156489 | | 8/2018 |
| WO | WO-2021127130 | A1 * | 6/2021 ......... B01D 46/0002 |

OTHER PUBLICATIONS

Office Action issued for German Patent Application No. 11 2020 002 530.6 dated Aug. 26, 2022, 12 pages, including translation.
International Search Report and Written Opinion issued for PCT Application No. PCT/US2020/031997 dated Jul. 31, 2020, 8 pages.
International Search Report and Written Opinion issued for PCT Application No. PCT/US2019/062781 dated Jan. 27, 2020, 8 pages.
First Office Action issued for Chinese Patent Application No. CN 202080034402.7 dated Mar. 31, 2022, 7 pages.
Non-Final Office Action on U.S. Appl. No. 17/610,110 dated Mar. 14, 2022.
Office Action issued for Chinese Patent Application No. CN 201980077208.4 dated Feb. 25, 2022, 9 pages.

* cited by examiner

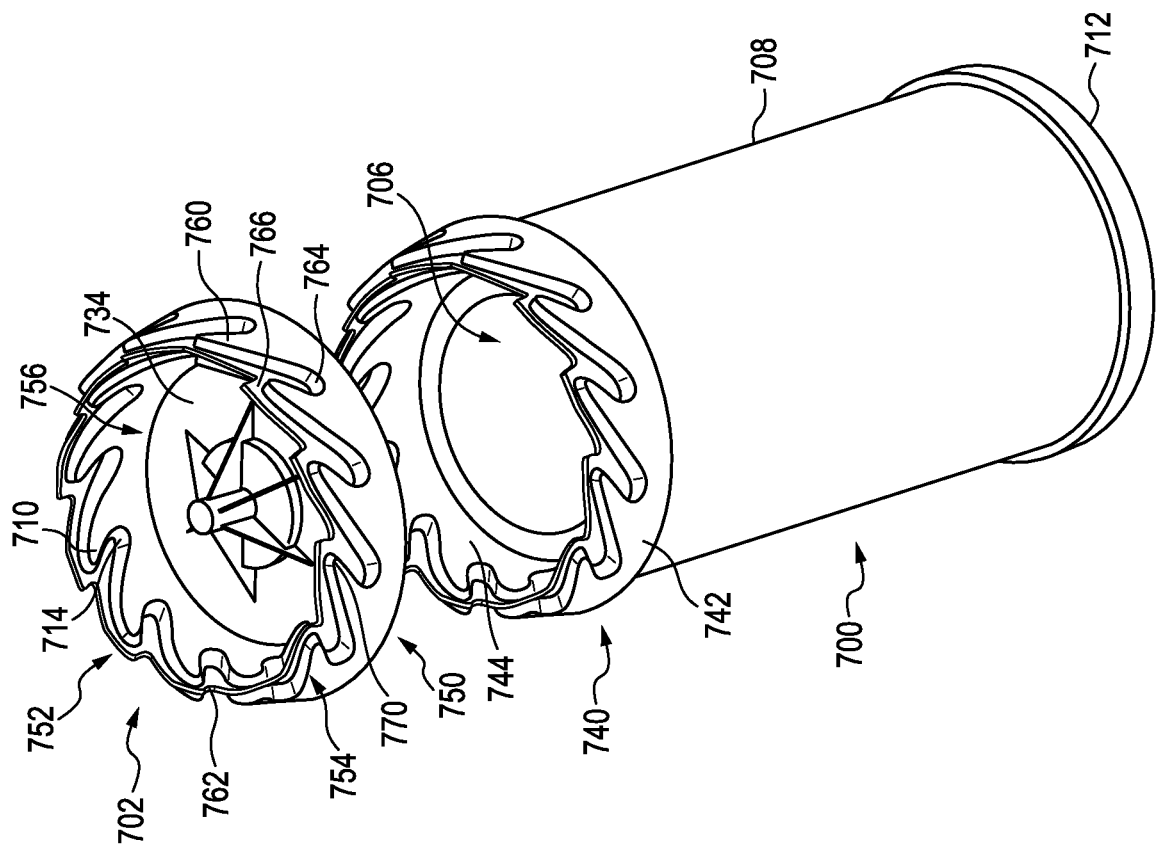

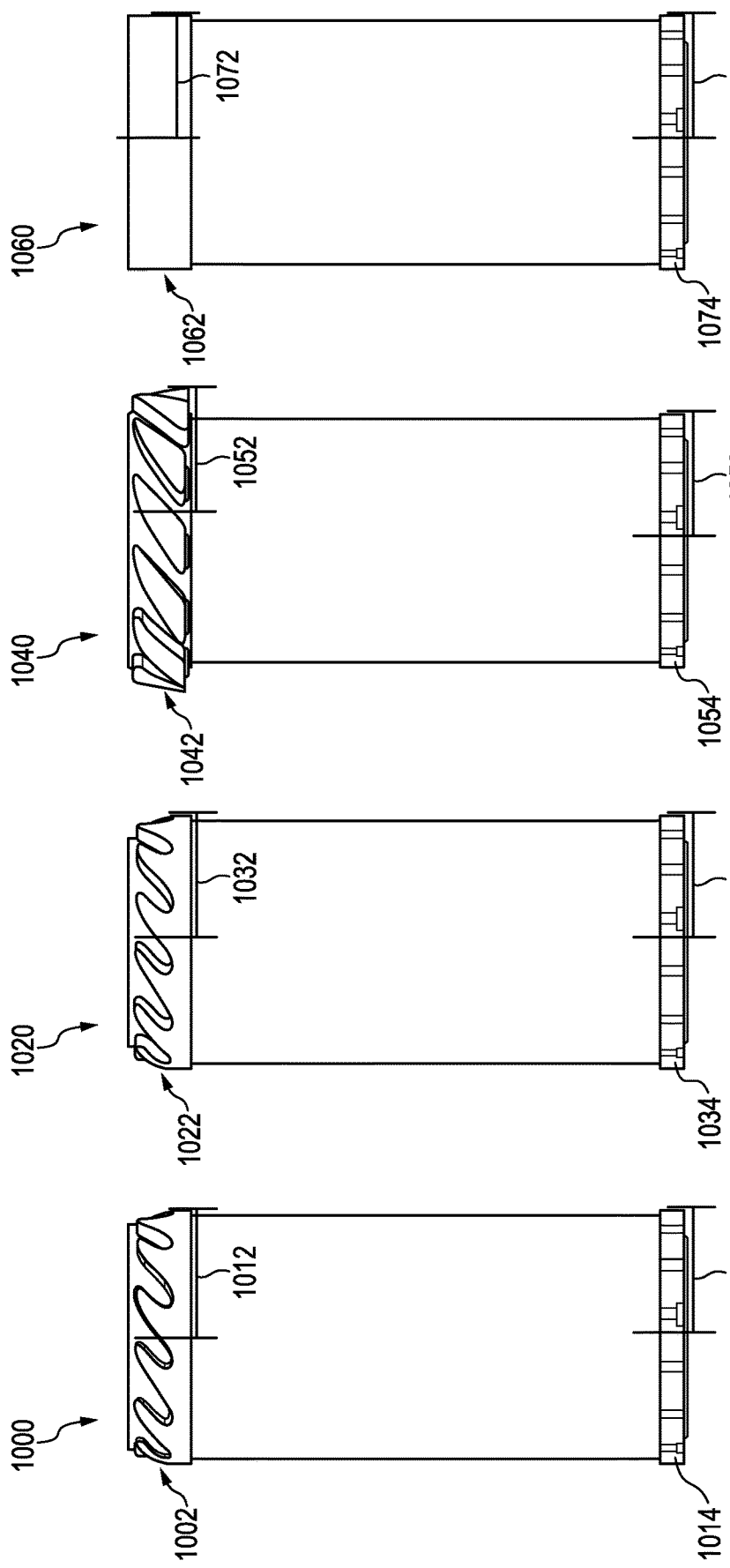

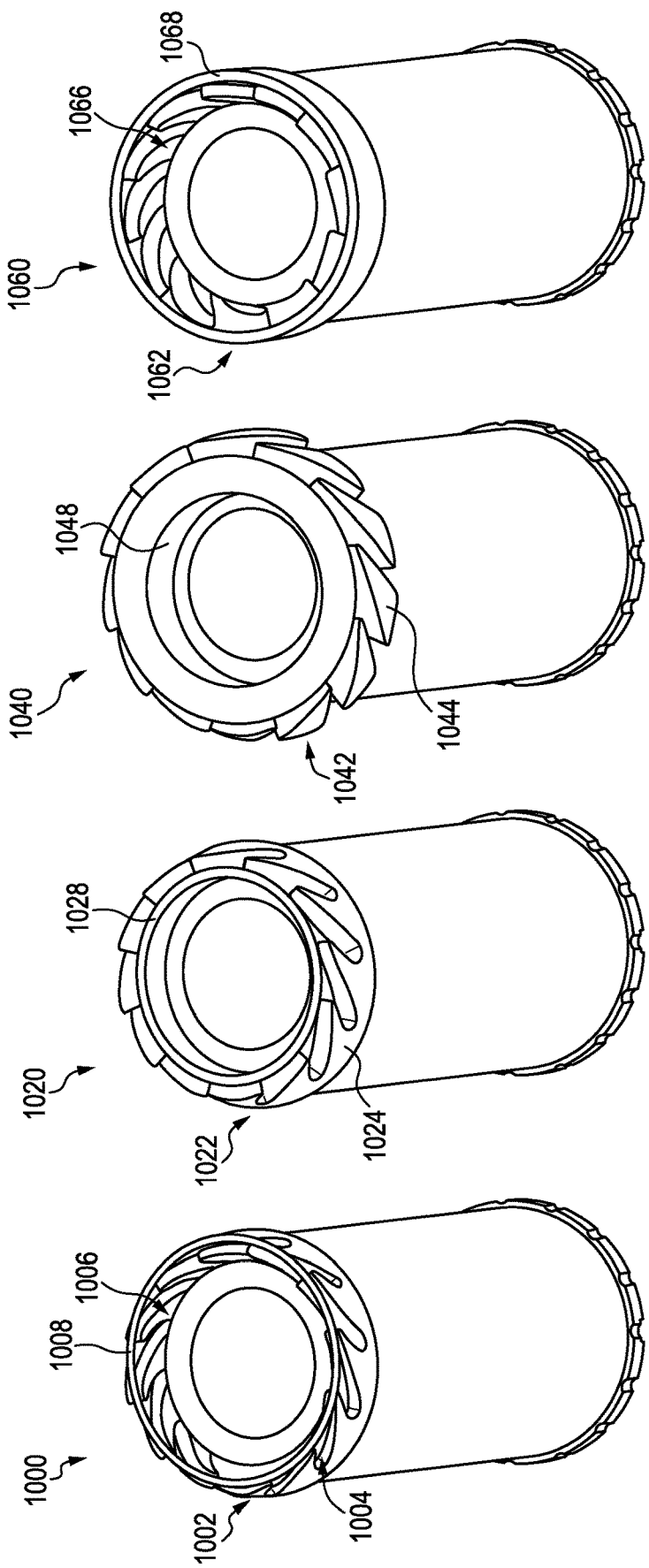

CURVED SEAL ON FILTER ELEMENT AND PROTECTIVE SEAL MOLD

CROSS-REFERENCE TO RELATED PATENT APPLICATION

The present application is a National Phase of PCT Application No. PCT/US2019/062781, filed Nov. 22, 2019, claims the benefit of priority to U.S. Provisional Patent Application No. 62/772,202, filed on Nov. 28, 2018. The contents of these applications are hereby incorporated by reference in their entirety.

FIELD

The present invention relates generally to air filtration systems for use with internal combustion engines or the like.

BACKGROUND

A number of conventional filtration systems make use of one or multiple seal members along the filter element. The integrity of the seal member(s) is integral to the proper functioning of the filtration system. The seal member is at risk to compromise (e.g., torn, deformed, distorted, become dirty, etc.) during the packaging, shipping, and installation of the filter element. In an attempt to deter filter compromise, a number of conventional filter elements may implement a cap or netting after the filter element and seal member is formed (e.g., molded).

SUMMARY

Various embodiments provide for a filter seal member mold. The filter seal member mold includes a first mold end and a second mold end disposed axially away from the first mold end. A first mold surface is disposed between the first mold end and the second mold end. The first mold surface includes at least one lobe mold and at least one guide channel mold. The at least one lobe mold is configured to form at least one lobe on an end of a filter element. The at least one guide channel mold is configured to form at least one guide channel on the end of the filter element. A second mold surface is disposed between the first mold end and the second mold end and disposed radially away from the first mold surface. A mold channel is formed between the first mold surface and the second mold surface. The mold channel includes a closed portion adjacent the first mold end and an open portion adjacent the second mold end. The mold channel is configured to receive the end of the filter element and form a filter seal member on the filter element.

Other embodiments relate to a method of forming a filter seal member on a filter element. The method includes providing a filter media. The filter media includes a first filter media end and a second filter media end axially disposed from the first filter media end. An endplate is secured to the first filter media end. A filter seal mold is provided. The filter seal member mold includes a first mold end and a second mold end disposed axially away from the first mold end. A first mold surface is disposed between the first mold end and the second mold end. The first mold surface includes at least one lobe mold and at least one guide channel mold. A second mold surface is disposed between the first mold end and the second mold end and disposed radially away from the first mold surface. A mold channel is formed between the first mold surface and the second mold surface. The mold channel includes a closed portion adjacent the first mold end and an open portion adjacent the second mold end. A filter seal material is dispensed into the mold channel. The second filter media end is inserted into the mold channel to form the filter seal member on the second filter media end. The filter seal member includes at least one lobe formed by the at least one lobe mold and at least one guide channel formed by the at least one guide channel mold.

Other embodiments relate to a filter element. The filter element includes a first filter end and a second filter end disposed axially away from the first filter end. Filter media is disposed between the first filter end and the second filter end. A filter seal member is formed on the first filter end. The filter seal member includes a first lobe, a second lobe, and a guide channel. The guide channel is disposed between the first lobe and the second lobe. The first lobe is non-parallel to the second lobe.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 7 is a perspective view of a filter element with a filter seal member formed using a closed protective seal mold, according to yet another example embodiment.

FIGS. 10A-10D show a side view of a variety of filter elements with different filter seal members formed using a protective seal mold.

FIGS. 11A-11D show a top perspective view of the variety of filter elements of FIGS. 10A-10D, respectively.

DETAILED DESCRIPTION

Figure 1A:
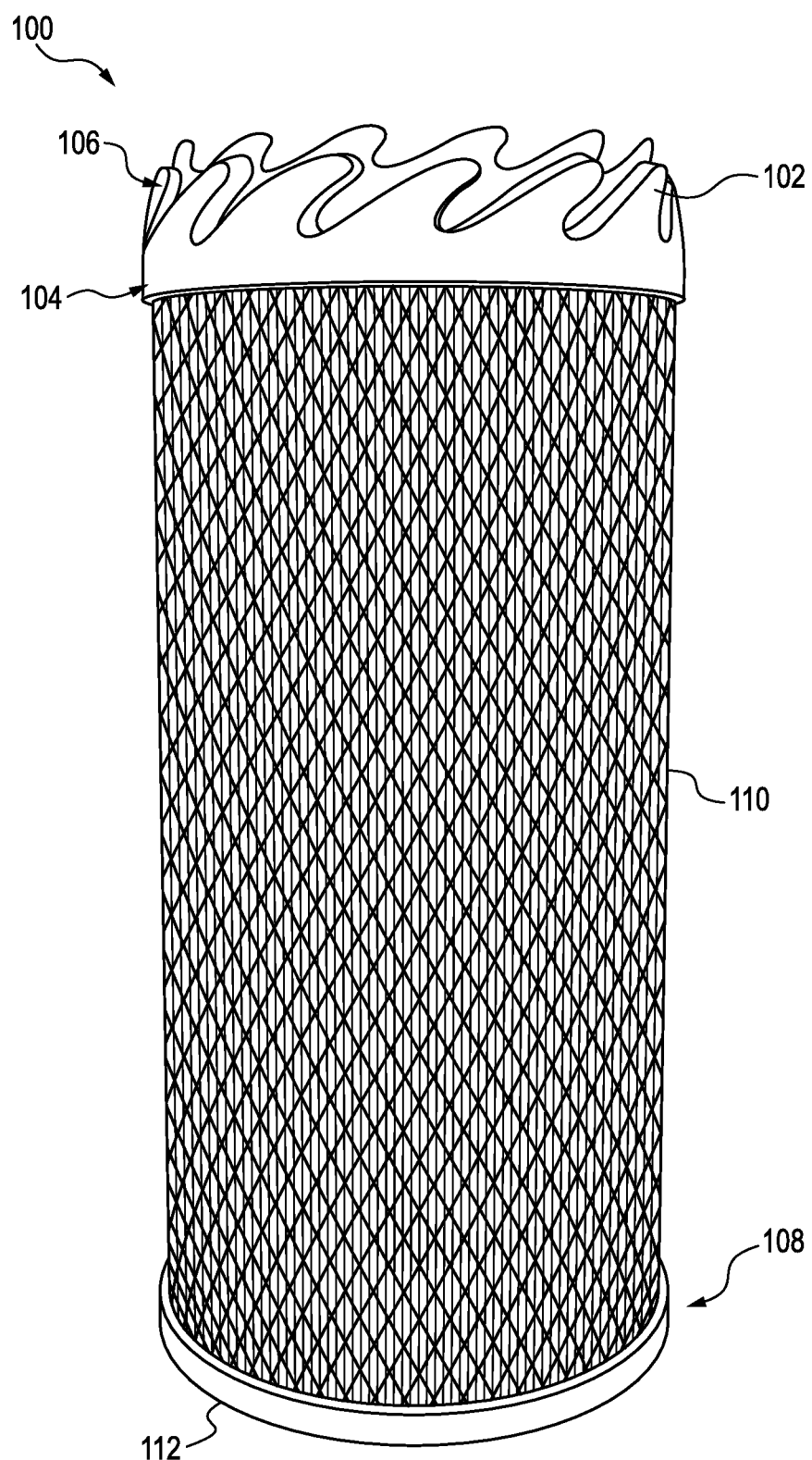
FIG. 1A is a perspective view of a filter element with a filter seal member and a protective seal mold, according to an embodiment.

Referring to the figures generally, the various embodiments disclosed herein relate to a manufacturing (e.g., making) a filter seal member on an end of a filter element that includes a protective filter seal member element. In some embodiments, the protective filter seal member element is a protective seal mold tray (e.g., protective seal member mold) that is used to manufacture the filter seal member and is also used as a protective sheath for the filter element. The protective seal mold facilitates the generation of the filter seal member and provides the protective sheath for the filter element during packing, transport, and installation to facilitate seal integrity and keep the seal and filter element clean. In other embodiments, the protective seal mold is used to manufacture the filter seal member and include a protective support ring that provides protection to the filter seal member. In those embodiments, the protective seal mold may also be used to cover and protect the filter seal member and support ring during packing, transport, and installation to facilitate seal integrity and keep the seal and filter element clean. In some embodiments, the filter seal is configured to ensure that the filter element is properly aligned when installed within a housing and that the filter element is mechanically locked into complementary undercuts in the housing when installed, thus deterring sag of the filter element.

The protective seal mold may be configured to form a wide variety of filter seal member shapes and configurations. The filter seal member may be configured to mechanically lock into complementary undercuts of a housing and may secure the filter element in place during vibrations and/or movement of the filter element, filter housing, or the filter assembly. The formed filter seal may be a curved filter seal, a non-parallel curved seal, a helical curved filter seal, a non-parallel curved filter seal, or similar shaped filter seal. In some embodiments, the formed filter seal may comprise parallel lobes around an outer surface of the filter seal member, which provides for greater surface area for retaining the filter element within a housing, compared to non-lobed filter elements. The formed filter seal may be formed on a single end of the filter end or may be disposed on both filter ends. In some embodiments, the protective seal mold may be configured to form a robust twist lock filter seal member that provides for a rotational (e.g., twisting) and translational installation method of the filter element into a filter housing, such that a seal is formed between the housing and filter element. The filter element described below may be installed into a filter assembly, such as an air filter assembly, that includes a filter housing, a filter cover, and a filter element.

Beneficially, the protective seal mold may be used during a method of manufacturing a filter seal member on an end of the filter element, such that the protective seal mold is mechanically attached to the filter seal member and retained on the filter seal member to protect a filter seal member material (e.g., urethane) and filter element. The protective seal mold may be configured to form a filter seal member disposed on an internal surface of an end of the filter element, on an external surface of an end of the filter element, or on both an internal and external surface of an end of the filter element. The protective seal mold may be configured to form a wide variety of shapes and orientations of one or more lobes that form the filter seal member. In some embodiments, the filter seal member is manufactured making use of a molding tray that includes the protective seal mold, the protective seal mold configured to assist in molding the filter seal member and remain along the filter seal member as a protective sheath for cleanliness. In some embodiments, the protective seal mold includes a closed end to prevent compromise of the internal portions of the filter element. The protective seal mold may be removed from the filter element when the filter element is removably positioned within the filter housing. The filter element includes a protective seal mold, as described further herein.

Protective Seal Mold

Referring to FIG. 1A, a perspective view of a filter element 100 with a filter seal member 106 and a protective seal mold 102 is shown, according to an embodiment. As will be appreciated, the filter seal member 106 is covered by the protective seal mold 102 to prevent compromise of the filter element 100 and filter seal member 106. The filter seal member 106 is substantially similar in shape and pattern to the protective seal mold 102 as the protective seal mold 102 is used to form the filter seal member 106. The filter element 100 includes a first filter end 104 that includes the filter seal member 106 and a second filter end 108 that includes an endplate 112. While the endplate 112 is shown in FIG. 1A as a closed endplate and the first filter end 104 is an open filter end, the endplate 112 may be an open endplate and the first filter end 104 may be a closed filter end, or the endplate 112 may be an open endplate and the first filter end 104 may be an open filter end. The filter element 100 includes filter media 110 disposed between the first filter end 104 and the second filter end 108. Although the filter media 110 is shown arranged as a cylindrical filter block having a circular cross-sectional shape, the filter media 110 can be arranged in other shapes (e.g., racetrack or oval shapes). The filter media 110 may comprise, for example, pleated filter media 110 arranged in a panel or pleat block, corrugated filter media (often referred to as pleated filter media 110) that is arranged in a panel, a block, a cylinder, or the like, other arrangements.

In one set of embodiments, the filter media 110 is generally formed by a flat sheet of filter media 110 and a formed sheet of filter media 110. The formed sheet includes a plurality of crests formed by a curves and/or pleats in the sheet. The plurality of crests form tetrahedron channels between the formed sheet and the flat sheet. Embossments, such as dimples, are provided on the crests formed by the curves and/or pleats. The embossments help to maintain spacing between adjacent layers of the filter media (i.e., between the formed sheet and the flat sheet), thereby increasing dust holding capacity and lowering pressure drop over similarly configured filter media not having the embossments. In some arrangements, the filter media 110 is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet.

In some arrangements, the filter media 110 includes a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. In an alternate arrangement, the flow channels comprise flutes that are alternately sealed at the upstream and downstream ends.

The filter element 100 may be substantially rigid such that the shape of the filter element 100 is substantially maintained during installation and use. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying with a stiffening agent, such as BASF® Elastocast 55090, polyurethane, or the like, etc.).

Figure 1B:
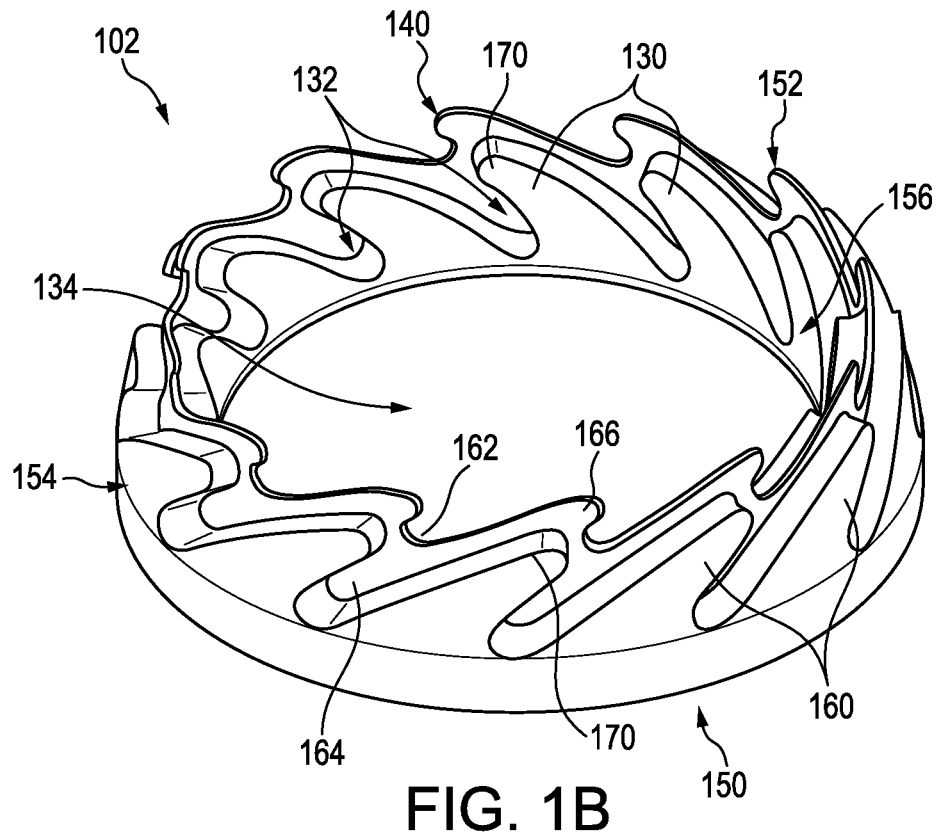
FIG. 1B is a top perspective view of the protective seal mold of FIG. 1A.
Figure 1C:
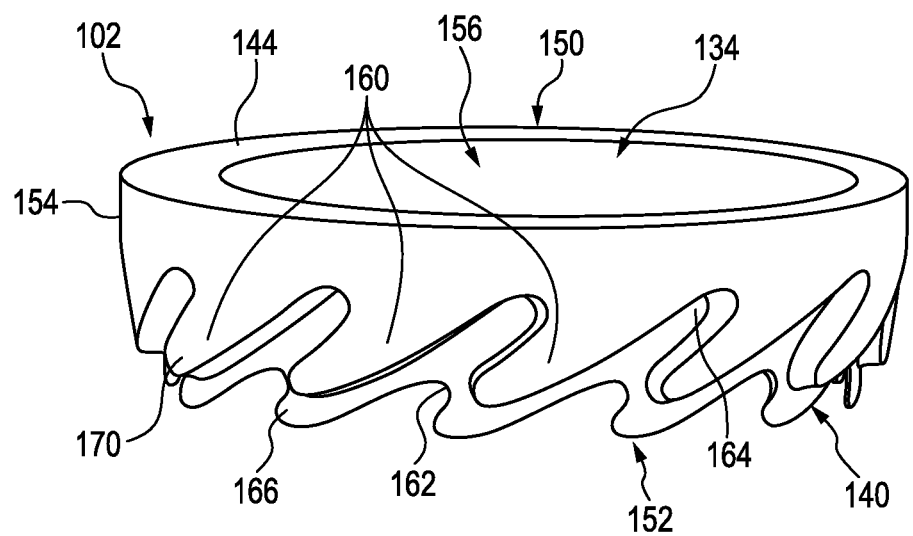
FIG. 1C is a bottom perspective view of the protective seal mold of FIG. 1B.

Perspective views of the protective seal mold 102 of FIG. 1A are shown in FIGS. 1B and 1C. The protective seal mold 102 is configured to form the filter seal member 106 and provide a removable protective covering to the filter seal member 106 during transport, thus the protective seal mold 102 is substantially similar in shape to the filter seal member 106. The protective seal mold 102 generates a filter seal member 106 that includes a protecting support ring 140 that is configured to ensure that the filter element 100 is properly aligned when installed within a housing and that the filter element 100 is mechanically locked into complementary undercuts in the housing when installed, thus deterring sag of the filter element 100. The filter seal member 106 and/or the support ring 140 are configured to limit compression on the filter seal formed on the filter element when the filter element is installed within a housing.

The protective seal mold 102 includes a first mold end 150 and a second mold end 152 disposed axially away from the first mold end 150. The protective seal mold 102 includes an outer mold surface 154 and an inner mold surface 156. A central opening 134 is defined within the protective seal mold 102. As shown in FIGS. 1B and 1C, the support ring 140 is defined by the outer plurality of guide channel molds 164 and the inner plurality of guide channel molds 132 and bisects the outer mold surface 154 and the inner mold surface 156. The outer mold surface 154 of the protective seal mold 102 includes an outer plurality of lobe molds 160 (e.g., protrusions) and an outer plurality of guide channel molds 164 disposed between each lobe mold in the outer plurality of lobe molds 160. The outer plurality of lobe molds 160 and the outer plurality of guide channel molds 164 are configured to form similar features on an external surface of an end of a filter element to form an external seal when installed within a complementary housing. The inner mold surface 156 of the protective seal mold 102 includes an inner plurality of lobe molds 130 and an inner plurality of guide channel molds 132 disposed between each lobe mold in the inner plurality of lobe molds 130. The inner plurality of lobe molds 130 and the inner plurality of guide channel molds 132 are configured to form similar features on an inner surface of an end of a filter element to form an inner seal when installed within a complementary housing. While the inner plurality of lobe molds 130 is shown as having an identical size and shape to the outer plurality of lobe molds 160, in some embodiments, the inner plurality of lobe molds 130 have different shapes, sizes, and/or configurations compared to the outer plurality of lobe molds 160. The plurality of lobe molds may be configured to have a wide range of lobes (e.g., 1-28) with various periodicity angles and curved shapes. Further, each lobe in the outer plurality of lobe molds 160 is aligned with (e.g., adjacent each other on each side of the support ring 140) a corresponding lobe in the inner plurality of lobe molds 130.

Each guide channel mold in the plurality of guide channel molds 164 includes a hook opening 162 and a support surface 166. As shown in FIGS. 1B and 1C, the support surface 166 is disposed on the second mold end 152 above a peak 170 of a lobe mold in the plurality of lobe molds 160 and has a generally dorsal shape. In some embodiments, the support surface 166 is configured to mechanically lock into complementary undercuts in the housing when the filter element 100 is installed within a housing. In some embodiments, the support surface 166 is substantially flat (e.g., parallel to the first mold end 150), saw-toothed shaped, or another non-parallel, curved shape.

The hook opening 162 extends from one support surface 166 to a support surface of an adjacent guide channel mold in the plurality of guide channel molds 164. As shown in FIG. 1A, the hook opening 162 has a rounded "check mark" structure. In some embodiments, the hook opening 162 and the support surface 166 are identical in shape and orientation to a support ring that is integrated with the filter seal member and configured to provide a pre-cleaner sleeve with protection against undesired compression of the filter seal member. As will be appreciated, the various features on the outer mold surface 154 (e.g., plurality of lobe molds 160, plurality of guide channel molds 164, hook opening(s) 162, and support surface(s) 166) are configured to form similar features on the first filter end 104 that are configured to engage a complementary feature on a housing during installation and form a seal between the housing and filter element 100. In some embodiments, the hook opening 162 and the support surface 166 form a dorsal feature that provides a lead-in and guidance for engaging a filter seal member (formed by the protective seal mold 102) of a filter element within a complementary housing.

FIG. 1C shows a bottom perspective view of the protective seal mold 102 that includes the mold channel 144 that receives urethane, or a similar material) to form the filter seal member on an end of the filter element. An internal plurality of guide channel molds (e.g., the inner plurality of guide channel molds 132 and the outer plurality of guide channel molds 164) are separated by a mold support channel that is the internal portion of the support ring 140. Similarly, an internal plurality of lobe molds (e.g., the inner mold plurality of lobe molds 130 and the outer plurality of lobe molds 160) are separated by the mold support channel. The mold support channel is configured to form the hook opening 162 and a support surface 166. In some embodiments, the mold support channel is configured to receive a support ring that may be included in the filter seal member to secure urethane and keep the shape of the filter seal member.

Figure 2B:
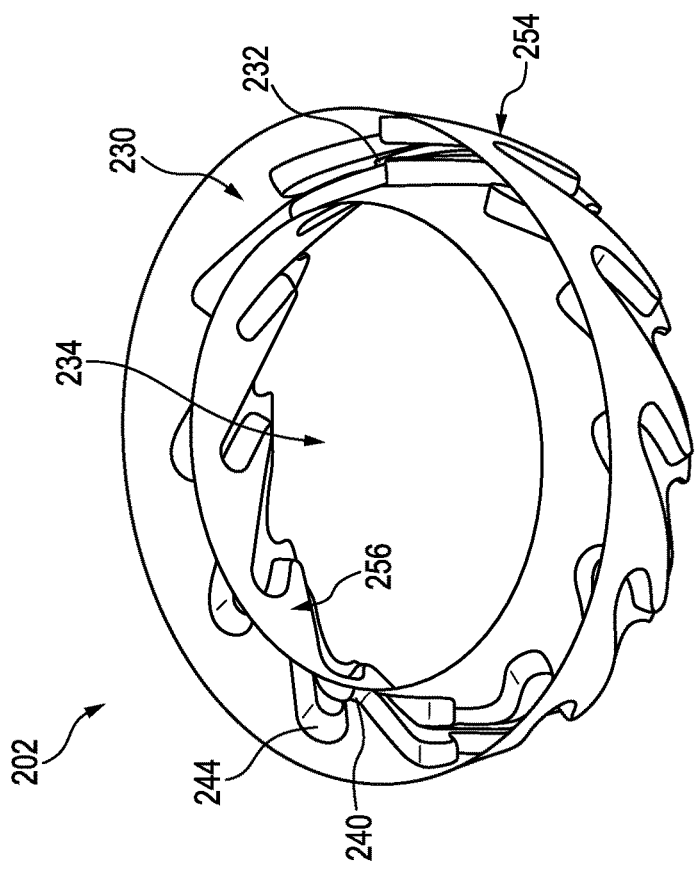
FIG. 2B is a bottom perspective view of a protective seal mold for protecting and manufacturing a filter seal member for a filter element of FIG. 2A.
Figure 2A:
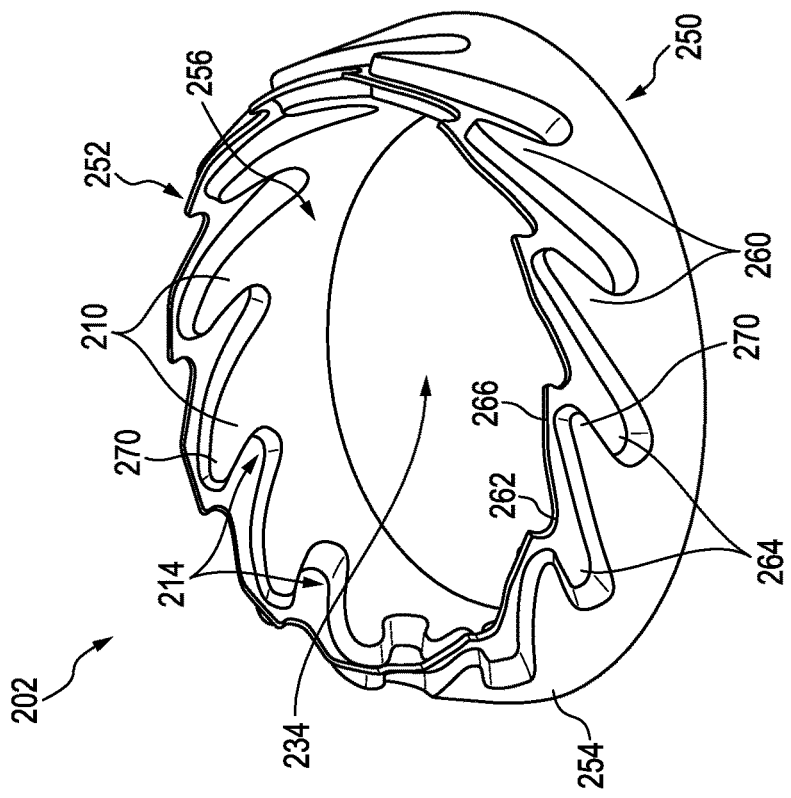
FIG. 2A is a top perspective view of a protective seal mold for protecting and manufacturing a filter seal member for a filter element, according to an embodiment.

Turning to FIGS. 2A and 2B, views of a protective seal mold 202 are shown, according to an example embodiment. The protective seal mold 202 is similar to the protective seal mold 102. A difference between the protective seal mold 202 and the protective seal mold 102 is the shape of the support surfaces. Accordingly, like numbering is used to designate like parts between the protective seal mold 202 and the protective seal mold 102. The protective seal mold 202 is configured to form a filter seal member and provide a removable protective covering to the filter seal member during transport, thus the protective seal mold 202 is substantially similar in shape to the filter seal member.

In some embodiments, the protective seal mold 202 may be formed using an injection mold technique that provides for uniform wall thickness. In those embodiments, the mold may include polypropylene, low density polyethylene, high density polyethylene, or similar materials. For example, the protective seal mold 202 may be an injection molded polypropylene tray. In other embodiments, the protective seal mold 202 may be formed using a vacuum formation technique. For example, the protective seal mold 202 may be a vacuum formed polypropylene tray. The protective seal mold 202 may be formed using plastic, aluminum, or similar materials.

The protective seal mold 202 includes a first mold end 250 and a second mold end 252 disposed axially away from the first mold end 250. The protective seal mold 202 includes an outer mold surface 254 and an inner mold surface 256. A central opening 234 is formed within the protective seal mold 202. The outer mold surface 254 of the protective seal mold 202 includes an outer plurality of lobe molds 260 (e.g., protrusions) and an outer plurality of guide channel molds 264 disposed between each lobe mold in the outer plurality of lobe molds 260. The outer plurality of lobe molds 260 and the outer plurality of guide channel molds 264 are configured to form similar features on an external surface of an end of a filter element to form an external seal when installed within a complementary housing. The inner mold surface 256 of the protective seal mold 202 includes an inner plurality of lobe molds 210 and an inner plurality of guide channel molds 214 disposed between each lobe mold in the inner plurality of lobe molds 210. The inner plurality of lobe molds 210 and the inner plurality of guide channel molds 214 are configured to form similar features on an inner surface of an end of a filter element to form an inner seal when installed within a complementary housing. While the inner plurality of lobe molds 210 is shown as having an identical size and shape to the outer plurality of lobe molds 260, in some embodiments, the inner plurality of lobe molds 210 have different shapes, sizes, and/or configurations compared to the outer plurality of lobe molds 260. The plurality of lobe molds may be configured to have a wide range of lobes with various periodicity angles and curved shapes that match the pitch of the complementary housing that receives the filter seal.

Each guide channel mold in the plurality of guide channel molds 264 includes a hook opening 262 and a support surface 266. In some embodiments, the support surface 266 is disposed on the second mold end 252 above a peak 270 of a lobe mold in the plurality of lobe molds 260 and is substantially horizontal (e.g., parallel to the first mold end 250). The hook opening 262 extends from one support surface 266 to a support surface of an adjacent guide channel mold in the plurality of guide channel molds 264. As shown in FIG. 2A, the hook opening 262 has a rounded "check mark" structure. In some embodiments, the hook opening 262 and the support surface 266 are identical in shape and orientation to a support ring that is integrated with the filter seal member and configured to provide a pre-cleaner sleeve with protection against undesired compression of the filter seal member. In other words, the support surface 266 and/or hook opening 262 are configured to limit compression on the filter seal formed on the filter element when the filter element is installed within a housing. In some embodiments, the support surface 266 and/or hook opening 262 are formed by a separate support ring component implemented during formation of the filter seal. In some embodiments, the hook opening 262 and the support surface 266 form a saw-toothed, dorsal-shaped, or similar protruding feature that provides a lead-in and guidance for engaging a filter seal member (formed by the protective seal mold 202) of a filter element within a complementary housing.

FIG. 2B shows a bottom perspective view of the protective seal mold 202 that includes the mold channel 230 that receives urethane, or a similar material) to form the filter seal member on an end of the filter element. An internal plurality of guide channel molds 244 (e.g., the shape that forms the inner plurality of guide channel molds 214 and the outer plurality of guide channel molds 264 on the outer surface of the protective seal mold 202) are separated by a mold support channel 232. Similarly, an internal plurality of lobe molds 240 (e.g., the inner mold plurality of lobe molds 210 and the outer plurality of lobe molds 260) are separated by the mold support channel 232. The mold support channel 232 is configured to form the hook opening 262 and a support surface 266. In some embodiments, the mold support channel 232 is configured to receive a support ring that may be included in the filter seal member to secure urethane and keep the shape of the filter seal member. In some embodiments, the mold support channel 232 form a saw-toothed, dorsal-shaped, or similar protruding feature that provides a lead-in and guidance for engaging a filter seal member (formed by the protective seal mold 202) of a filter element within a complementary housing.

Figure 3B:
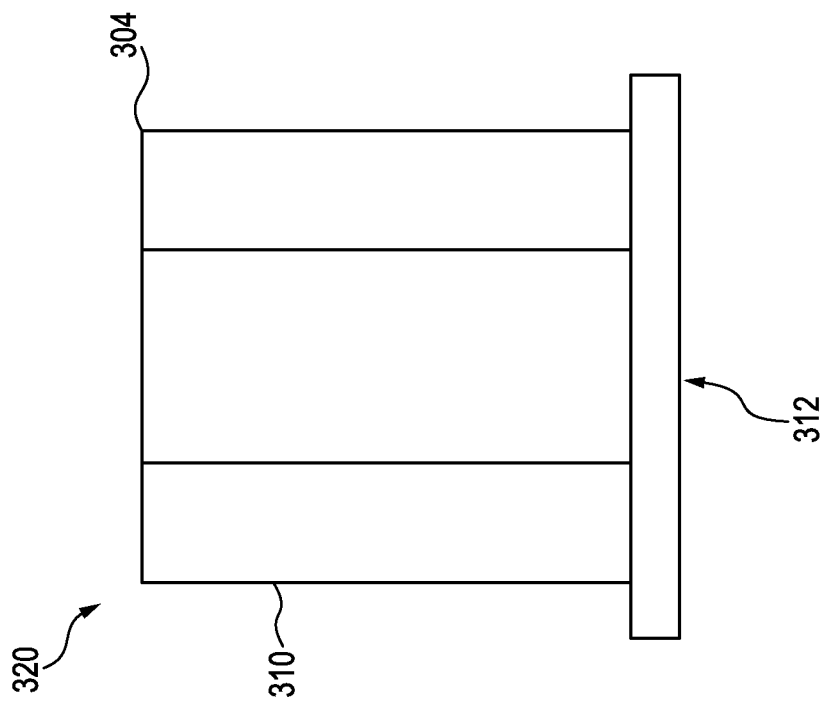
FIGS. 3A-3F depict the processes of an example method of manufacturing a filter seal member using a protective seal mold.
Figure 3A:
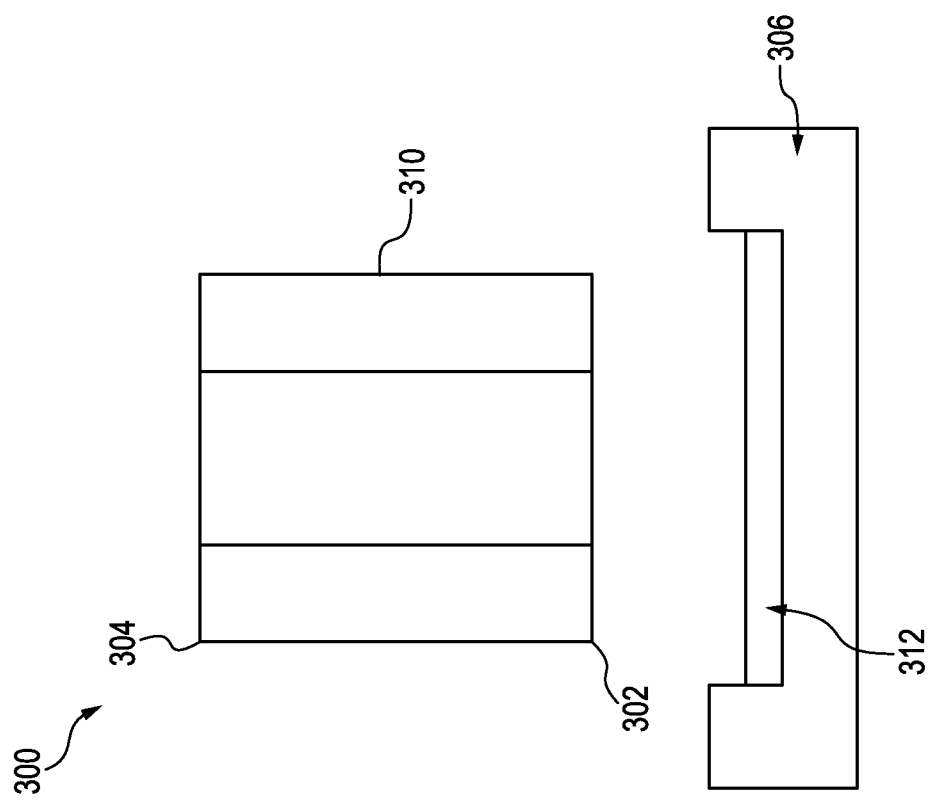
Figure 3D:
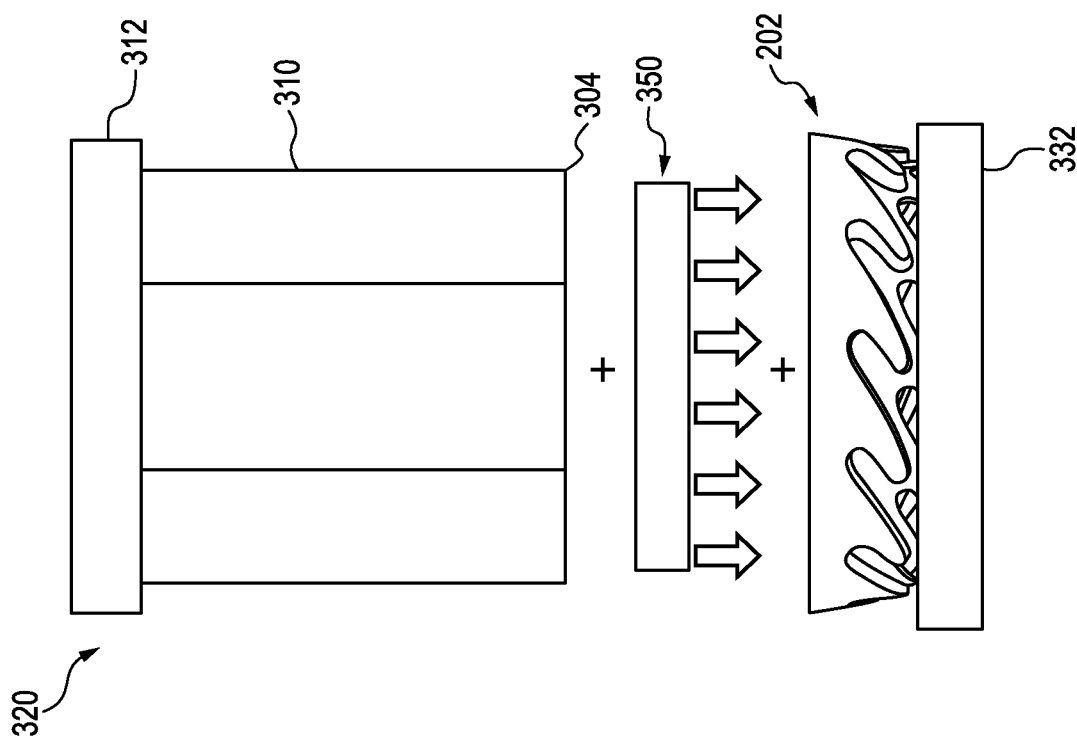
Figure 3C:
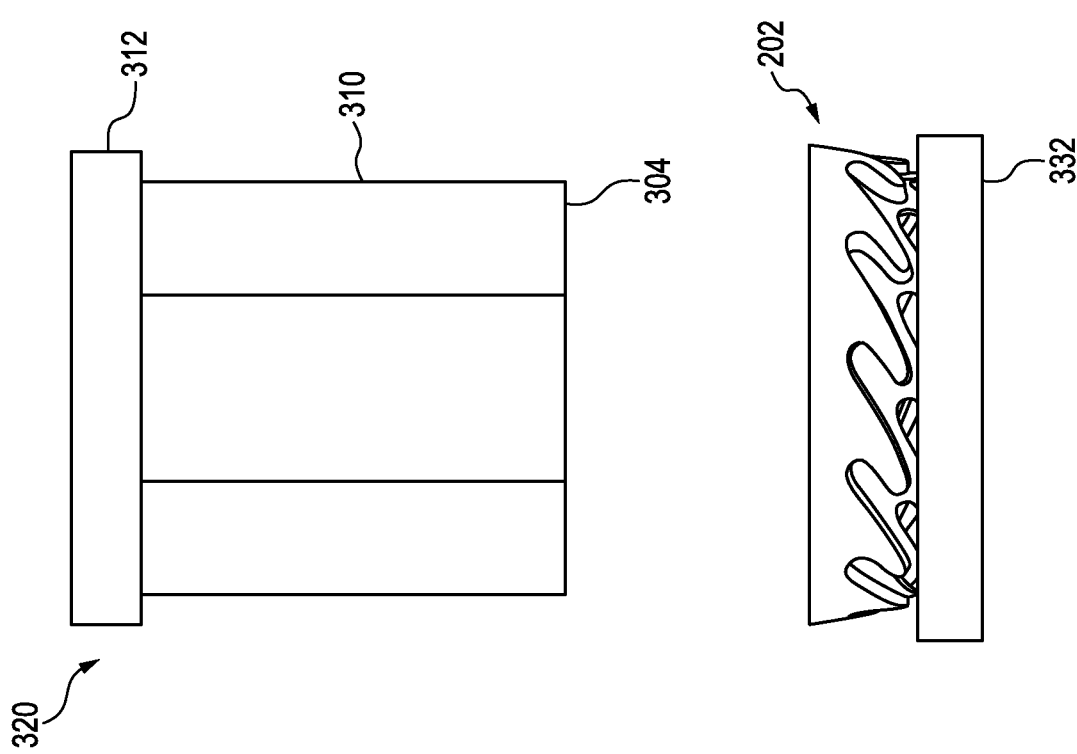

Referring to FIGS. 3A-3F, various views of forming a filter element 300 with the protective seal mold 202 of FIGS. 2A and 2B are shown, according to an example embodiment. First, an unassembled filter element 300 having a first filter end 302, a second filter end 304, and filter media 310 is positioned above an endplate 312 on a manufacturing surface 306. As shown in FIG. 3B, the endplate 312 is secured onto the first filter end 302 to form a filter element 320 with a closed endplate 312 and an open end on the second filter end 304. The endplate 312 may be secured by dispensing a urethane seal or spraying polyurea. Next, as shown in FIG. 3C, the filter element 320 is prepared to be installed into the protective seal mold 202 so that a filter seal member may be formed on the second filter end 304 of the filter element 320. The protective seal mold 202 is placed on an installation surface 332. In some embodiments, a support ring is installed within the mold support channel 232 to provide additional protection to the filter seal member. In some embodiments, the protective seal mold 202 includes a set of radial protrusions that form a substantially square shape and a central tray portion such that the protective seal mold is a protective seal mold tray.

Figure 3F:
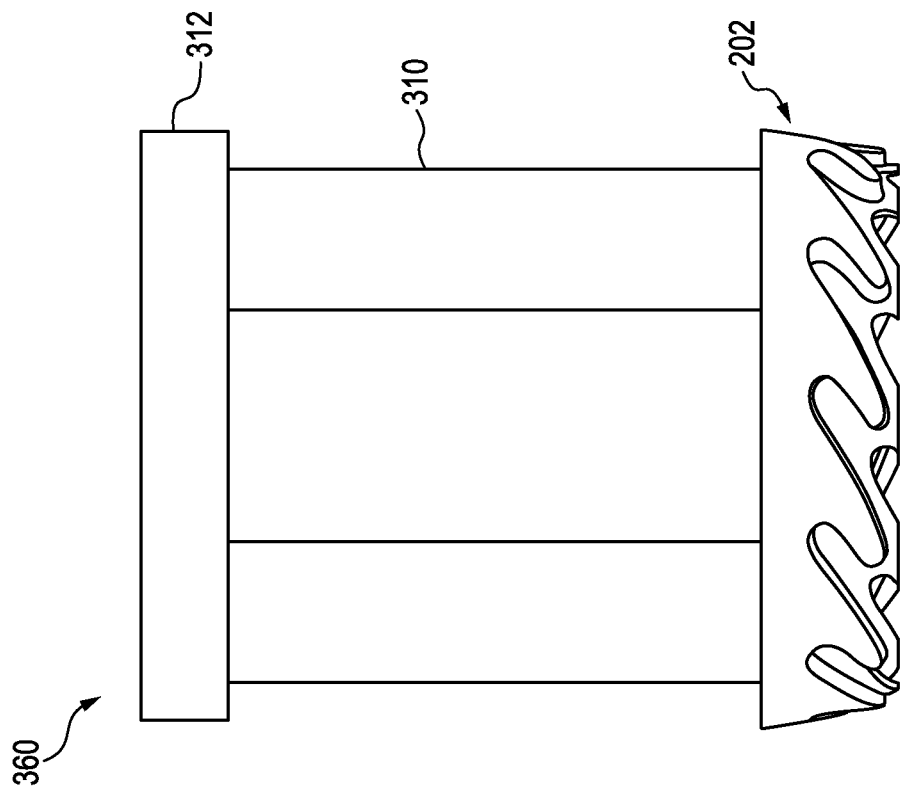
Figure 3E:
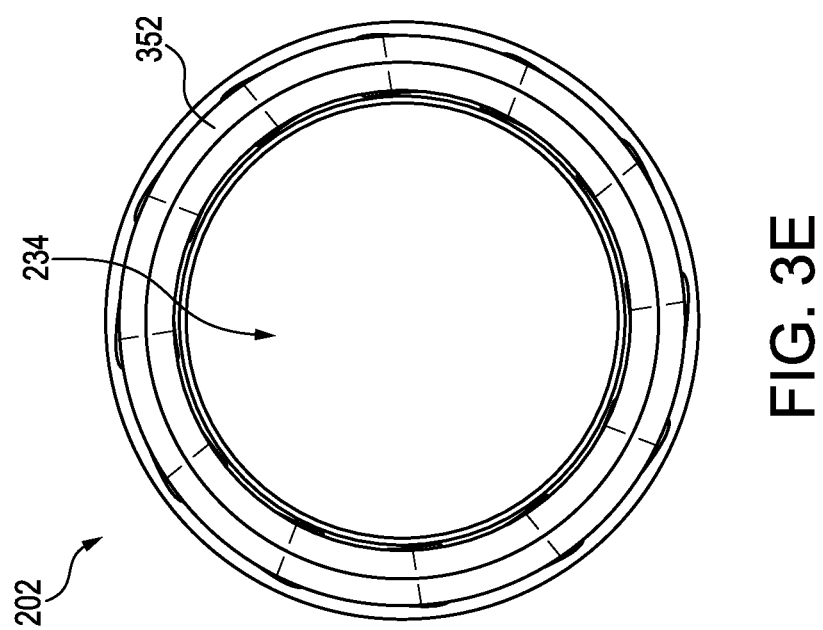

Turning to FIGS. 3D-3F, a dispensing head 350 is used to dispense the filter seal member material into the protective seal mold 202 to form the filter seal member 352 as the second filter end 304 is disposed within the protective seal mold 202. The filter element 360 with a filter seal member 352 is formed within the protective seal mold 202. This process may be accomplished by dispensing and distributing the urethane at an angle and rotating the mold to ensure a complete filter seal member. In some embodiments, the process may be accomplished by dispensing and distributing the urethane at an angle, rotating the dispensing head 350 around the stationary protective seal mold 202. As will be appreciated, the filter seal member 352 is protected by the protective seal mold 202 during packaging and transport of the filter element 360. When the filter element 360 is ready to be installed within a housing, the protective seal mold 202 is removed from the filter seal member 352 by rotating (e.g., unscrewing) the filter seal member 352 from the protective seal mold 202. In some embodiments, the same or an additional protective seal mold 202 is used to form a filter seal member on the first filter end 302 in addition to the second filter end 304.

Protective Support Ring

In some embodiments, a protective seal mold 202 is used to form a filter seal member that includes a support ring 400 that is integrated with the filter seal member. The support ring 400 may be mechanically attached to the filter seal member and retained on the filter to protect the filter seal member and filter seal member material during packaging, transport, and installation of the filter element into a complementary housing. As will be appreciated, the support ring 400 may provide protection against filter seal member compromise such that the protective seal mold 202 is not needed to protect the filter seal member pre-installation. Beneficially, the support ring 400 is configured to be not interfere with the filter seal member and to allow for the filter element to be properly aligned during the installation process (e.g., form a seal) within the housing.

Figure 4B:
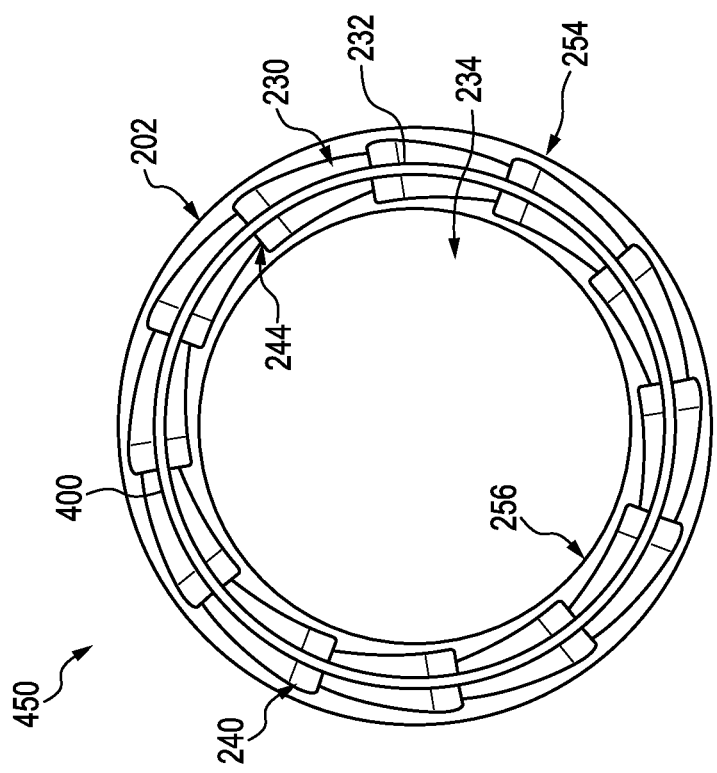
FIG. 4B is a top view of the support ring of FIG. 4A implemented with a protective seal mold, according to an embodiment.
Figure 4A:
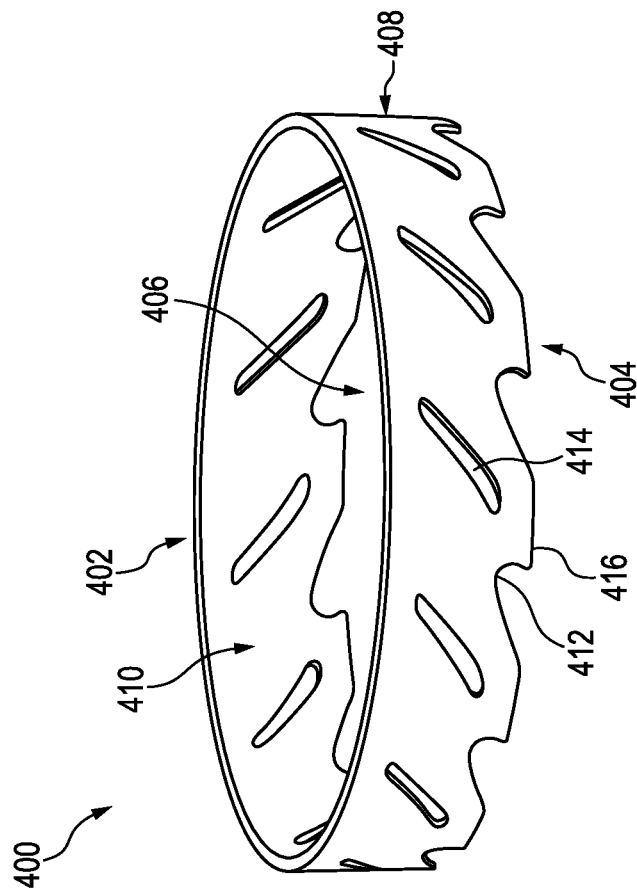
FIG. 4A is a perspective view of a support ring that may be implemented with a filter seal member using a protective seal mold, according to another example embodiment.

As shown in FIG. 4A, the support ring 400 includes a first ring end 402, a second ring end 404, and a central ring opening 406. An internal ring surface 410 and an external ring surface 408 are disposed between the first ring end 402 and the second ring end 404. A plurality of ring openings 414 are formed along the internal ring surface 410 and external ring surface 408. The plurality of ring openings 414 are configured to allow for the filter seal member material (e.g., urethane foam) to form through portions of the support ring 400 and retain the support ring 400 within the filter seal member. The second ring end 404 includes a plurality of support surfaces 416 and a plurality of hook openings 412. The plurality of support surfaces 416 and the plurality of hook openings 412 are configured to be inserted into the mold support channel 232 of the protective seal mold 202 and rotated to engage the internal plurality of guide channel molds 244 and each hook opening 262 and each support surface 266. Each hook opening in the plurality of hook openings 412 is disposed between a pair of support surfaces in the plurality of support surfaces 416. In other words, each hook opening in the plurality of hook openings 412 extends from one support surface to another support surface in the plurality of support surfaces 416. In some embodiments, the hook openings 412 have a shape similar to a rounded "check mark" structure flipped along a horizontal axis.

Turning to FIG. 4B, a protective seal mold and ring 450 is shown. The protective seal mold and ring 450 includes the support ring 400 disposed within the protective seal mold 202. The plurality of support surfaces 416 and the plurality of hook openings 412 of the support ring 400 are inserted into the mold support channel 232 of the protective seal mold 202 and rotated to engage the internal plurality of guide channel molds 244 and each hook opening 262 and each support surface 266 to form the protective seal mold and ring 450. In some embodiments, the plurality of support surfaces 416 and the plurality of hook openings 412 form a saw-toothed, dorsal-shaped or similar protruding feature that provides a lead-in and guidance for engaging a filter seal member (formed by the protective seal mold 202) of a filter element within a complementary housing.

Figure 4C:
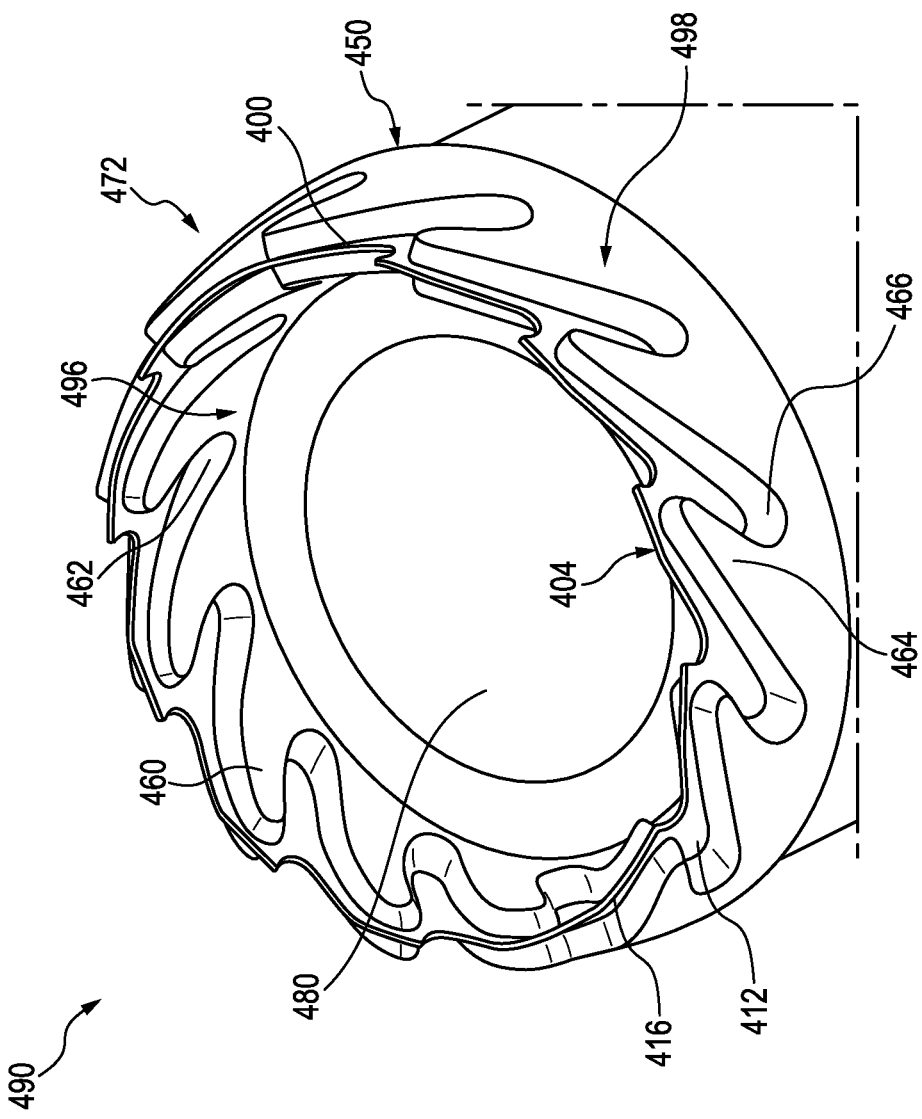
FIG. 4C is a top perspective view of a filter element with the support ring implemented with the protective seal mold of FIG. 4B, according to an embodiment.

A dispensing head, similar to the one described in FIGS. 3A-3F, may be used to dispense the filter seal member material into the protective seal mold 202 with the support ring 400 to form the filter seal member 472 on the filter element 490 as shown in FIG. 4C. The support ring 400 separates the filter seal member 472 into an inner seal portion 496 and an outer seal portion 498 such that the support ring 400 is formed within the filter seal member 472. A central opening 480 is defined within the protective seal mold 472. The inner seal portion 496 includes an inner plurality of lobes 460 and an inner plurality of guide channels 462 disposed between each lobe in the inner plurality of lobes 460. The inner plurality of lobes 460 and the inner plurality of guide channels 462 are configured to engage similar features on an inner surface of an end of a filter element to form an inner seal when installed within a complementary housing. The outer seal portion 498 includes an outer plurality of lobes 464 and an outer plurality of guide channels 466 disposed between each lobe in the outer plurality of lobes 464. The outer plurality of lobes 464 and the outer plurality of guide channels 466 are configured to engage similar features on an external surface of an end of a filter element to form an external seal when installed within a complementary housing. While the inner plurality of lobes 460 are shown as having an identical size and shape to the outer plurality of lobes 464, in some embodiments, the inner plurality of lobes 460 have different shapes, sizes, and/or configurations compared to the outer plurality of lobes 464. The plurality of lobes may be configured to have a wide range of lobes with various periodicity angles and non-parallel curved shapes. In some embodiments, the plurality of lobes may be parallel shapes.

Referring to FIGS. 5A-5F, various views of forming a filter element 570 with a protective seal mold 102 that includes a filter seal member 572 with a support ring 500 are shown, according to an example embodiment. The support ring 500 is similar in many respects to the support ring 400. A difference between the support ring 500 and the support ring 400 is that the support ring 500 includes a dorsal ending to the support surface. Accordingly, like numbering is used to designate like parts between the support ring 500 and the support ring 400. The support ring 500 may be mechanically attached to the filter seal member and retained on the filter to protect the filter seal member and filter seal member material during packaging, transport, and installation of the filter element into a complementary housing. As will be appreciated, the support ring 500 may provide protection against filter seal member compromise such that the protective seal mold 102 is not needed to protect the filter seal member pre-installation. Beneficially, the support ring 500 is configured to not interfere with the filter seal member and to allow for the filter element to be properly aligned during the installation process (e.g., form a seal) within the housing.

Figure 5B:
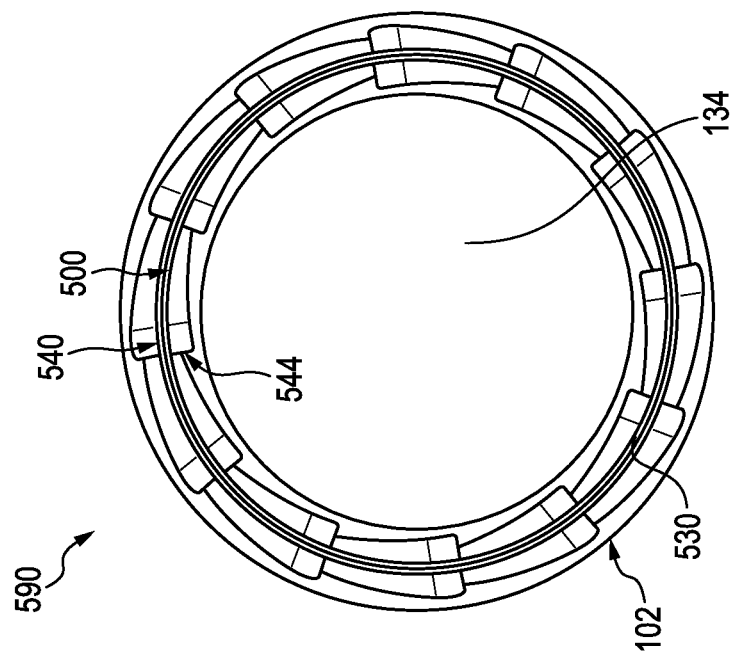
FIGS. 5A-5F depict the processes of an example method of manufacturing a filter seal member using a protective seal mold and a support ring, according to another example embodiment.
Figure 5A:
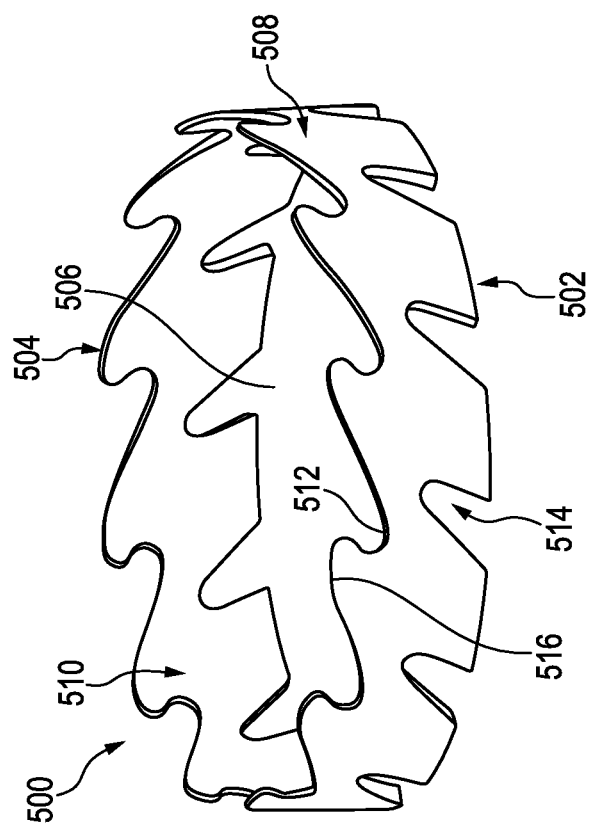

As shown in FIG. 5A, the support ring 500 includes a first ring end 502, a second ring end 504, and a central ring opening 506. An internal ring surface 510 and an external ring surface 508 are disposed between the first ring end 502 and the second ring end 504. A plurality of ring openings 514 are formed along the internal ring surface 510 and external ring surface 508 adjacent the first ring end 502. The plurality of ring openings 514 are configured to allow for the filter seal member material (e.g., urethane foam) to form through portions of the support ring 500 and retain the support ring 500 within the filter seal member. The second ring end 504 includes a plurality of support surfaces 516 and a plurality of hook openings 512. The plurality of support surfaces 516 have a substantially dorsal shape. The plurality of support surfaces 516 and the plurality of hook openings 512 are configured to be inserted into the mold support channel 530 of the protective seal mold and ring 590 and rotated to engage the internal plurality of guide channel molds 244 and each hook opening 262 and each support surface 266. Each hook opening in the plurality of hook openings 512 is disposed between a pair of support surfaces in the plurality of support surfaces 516. In other words, each hook opening in the plurality of hook openings 512 extends from one support surface to another support surface in the plurality of support surfaces 516. In some embodiments, the hook openings 512 have a shape similar to a rounded "check mark" structure flipped along a horizontal axis.

Turning to FIG. 5B, a protective seal mold and ring 590 is shown. The protective seal mold and ring 590 includes the support ring 500 disposed within protective seal mold and ring 590. The plurality of support surfaces 516 and the plurality of hook openings 512 of the support ring 500 are inserted into the mold support channel 530 of the protective seal mold and ring 590 and rotated to engage the internal plurality of guide channel molds 544 (e.g., the inner plurality of guide channel molds and the outer plurality of guide channel molds) and an internal plurality of lobe molds 540 (e.g., the inner plurality of lobe molds and the outer plurality of lobe molds). An unformed filter element 320 having an endplate 312 on the first filter end 302, a second filter end 304, and filter media 310 is provided above the protective seal mold and ring 590 on an installation surface 532. In some embodiments, the surface 532 is a support mold for the protective seal mold such that, when urethane is dispensed inside and is expanding outward radially, it does not contort the curved seal lobe due to the rigidity of the support mold holding the shape from expanding outward radially. The endplate 312 may be secured by dispensing a urethane seal or spraying polyurea. In some embodiments, the protective seal mold 202 may include a set of radial protrusions that form a substantially square shape and a central tray portion to form a protective seal mold tray. The radial protrusions may provide additional support and limit movement of a filter element 570 in a packaging, in embodiments where the protective seal mold and ring 590 is included on the filter element 570 during transport.

Figure 5D:
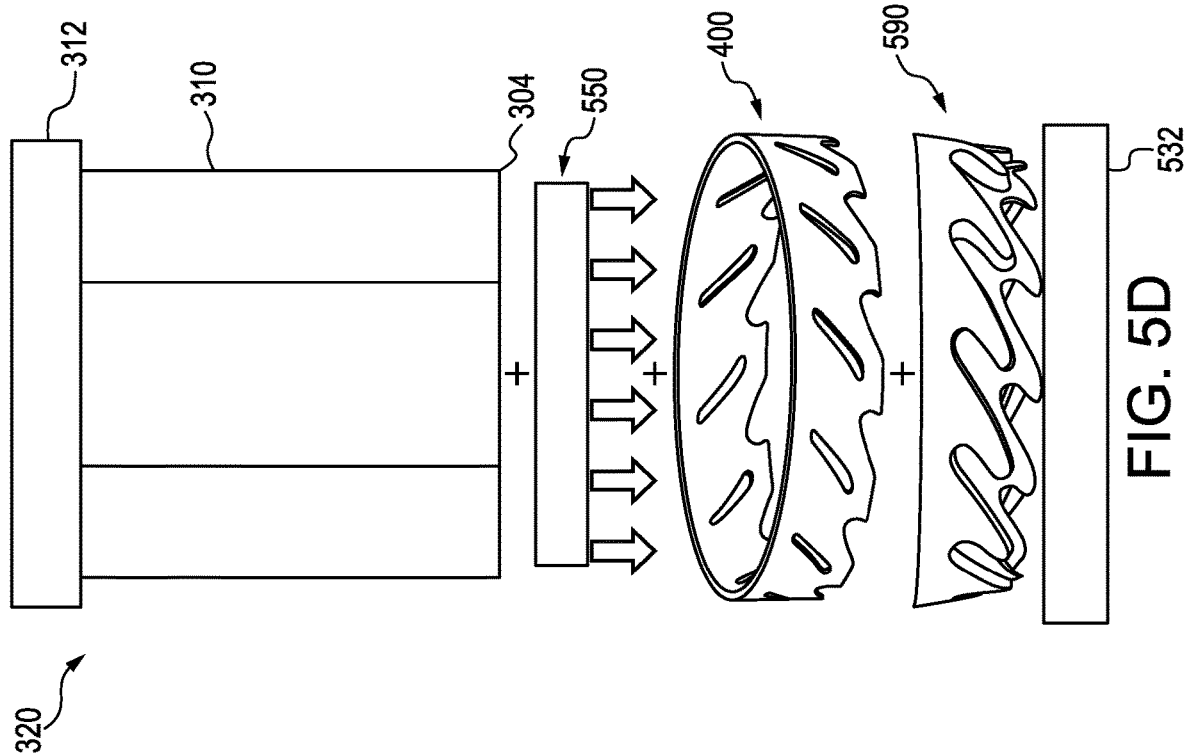
Figure 5C:
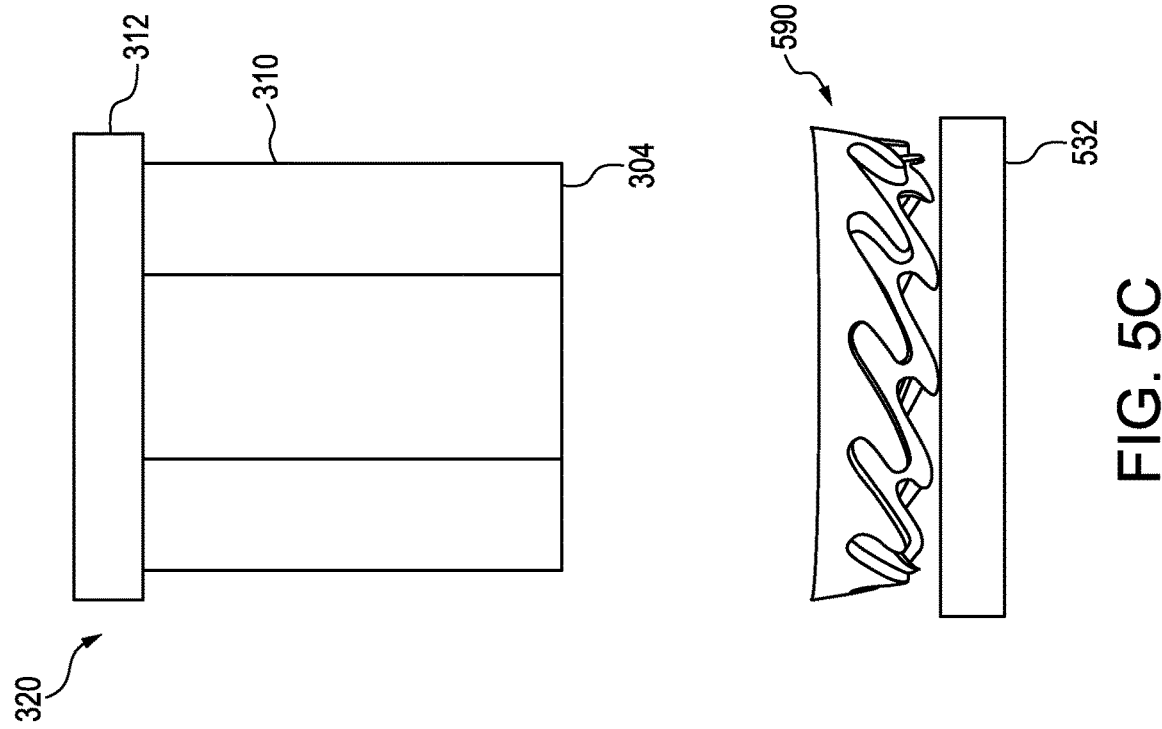

FIG. 5D depicts a dispensing head 550 is used to dispense the filter seal member material into the protective seal mold and ring 590 to form the filter seal member 572 as the second filter end 304 is disposed within the protective seal mold and ring 590. As shown in FIG. 5E, the support ring 400 separates the filter seal member 572 into an inner seal portion 596 and an outer seal portion 598 such that the support ring 400 is formed within the filter seal member 572. A central opening 580 is defined within the protective seal mold 590. The filter element 570 is removed from the protective seal mold 102 and includes the support ring 500 above the inner seal portion 596 and outer seal portion 598, thereby protecting them from damage and deformation pre-installation. In some embodiments, the same or an additional protective seal mold 102 is used to form a filter seal member on the first filter end 302 in addition to the second filter end 304.

Figure 5F:
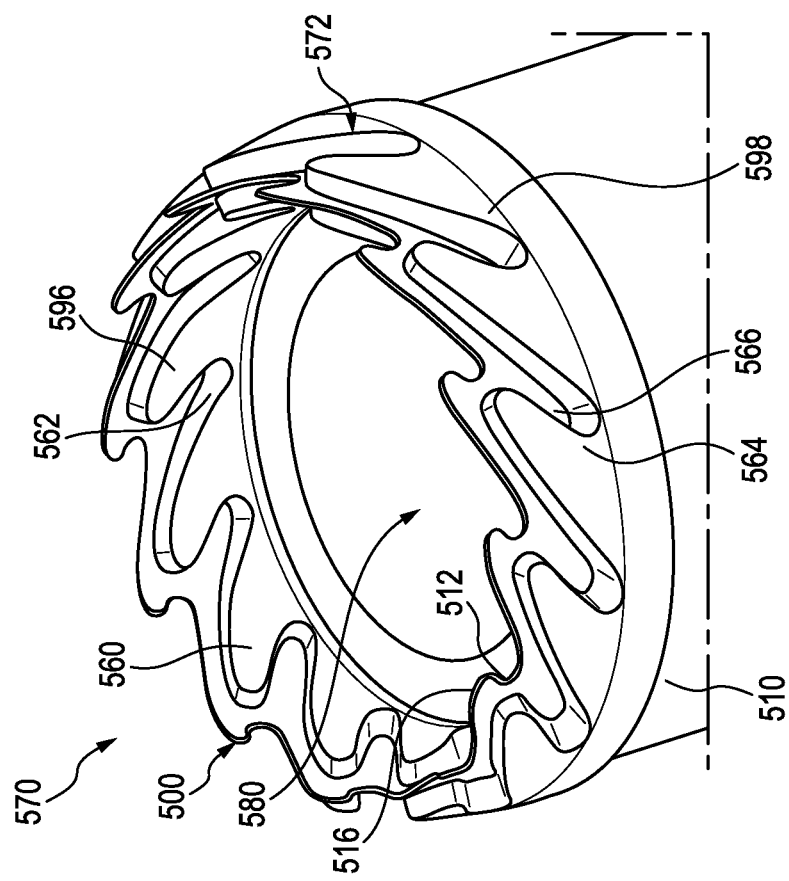
Figure 5E:
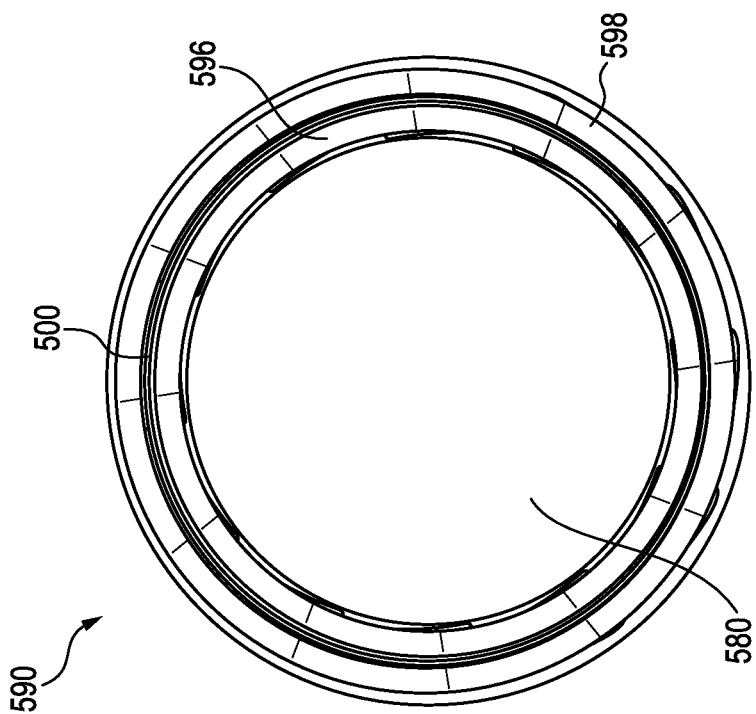

Turning to FIG. 5F, the inner seal portion 596 includes an inner plurality of lobes 560 and an inner plurality of guide channels 562 disposed between each lobe in the inner plurality of lobes 560. The inner plurality of lobes 560 and the inner plurality of guide channels 562 are configured to engage similar features on an inner surface of an end of a filter element to form an inner seal when installed within a complementary housing. The outer seal portion 598 includes an outer plurality of lobes 564 and an outer plurality of guide channels 566 disposed between each lobe in the outer plurality of lobes 564. The outer plurality of lobes 564 and the outer plurality of guide channels 566 are configured to engage similar features on an external surface of an end of a filter element to form an external seal when installed within a complementary housing. While the inner plurality of lobes 560 are shown as having an identical size and shape to the outer plurality of lobes 564, in some embodiments, the inner plurality of lobes 560 have different shapes, sizes, and/or configurations compared to the outer plurality of lobes 564. The plurality of lobes may be configured to comprise a wide range of lobes with various periodicity angles and non-parallel curved shapes, although parallel shapes and arrangements may be implemented in certain embodiments.

Filter Seal Member

Figure 6B:
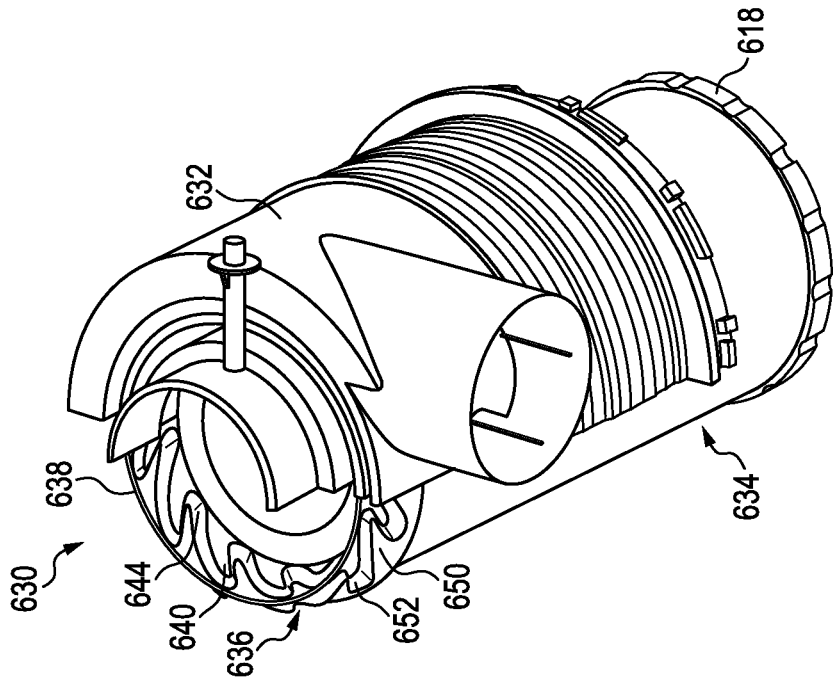
FIG. 6B is a top perspective view of a filter element with a filter seal member formed using a protective seal mold, according to another example embodiment.
Figure 6A:
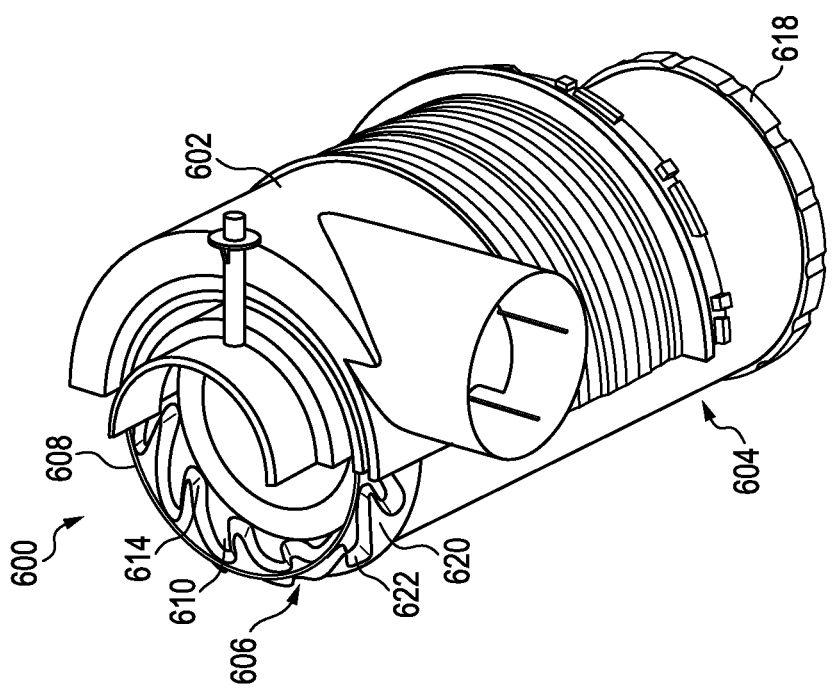
FIG. 6A is a top perspective view of a filter element with a filter seal member formed using a protective seal mold, according to an example embodiment.

FIG. 6A shows a top perspective view of a filter assembly 600 that includes a filter element 604 with an endplate 618 and a filter seal member 606 installed within a complementary housing 602, according to an example embodiment. The filter seal member 606 may be formed using a protective seal mold similar to the protective seal mold 102 of FIG. 1B, the protective seal mold 202 of FIG. 2A, and or the protective seal mold 102 of FIG. 5C. The filter seal member 606 includes an outer plurality of lobes 620 and the outer plurality of guide channels 622 configured to form an external seal when installed within the complementary housing 602 and an inner plurality of lobes 610 and an inner plurality of guide channels 614 configured to form an internal seal when installed within the complementary housing 602. The inner plurality of guide channels 614 are disposed between the inner plurality of lobes 610 and the outer plurality of lobes 620 are disposed between the outer plurality of guide channels 622. A ring channel of the protective seal mold forms a substantially flat ring 608 (e.g., no hook openings) that is disposed above the plurality of lobes.

FIG. 6B shows a top perspective view of a filter assembly 630 that includes a filter element 634 with an endplate 618 and a filter seal member 636 installed within a complementary housing 632, according to an example embodiment. The filter seal member 636 may be formed using a protective seal mold similar to the protective seal mold 102 of FIG. 1B, the protective seal mold 202 of FIG. 2A, and or the protective seal mold 102 of FIG. 5C. The filter seal member 636 includes an outer plurality of lobes 650 and the outer plurality of guide channels 652 configured to form an external seal when installed within the complementary housing 632 and an inner plurality of lobes 640 and an inner plurality of guide channels 644 configured to form an internal seal when installed within the complementary housing 632. The inner plurality of guide channels 644 are disposed between the inner plurality of lobes 640 and the outer plurality of lobes 650 are disposed between the outer plurality of guide channels 652. A support ring 638 is integrally formed between the inner and outer seal of the filter seal member 636 as the support ring 638 was included in a mold support channel of the protective seal mold. This process may be similar to the process described in FIGS. 5A-5F above.

Figure 6D:
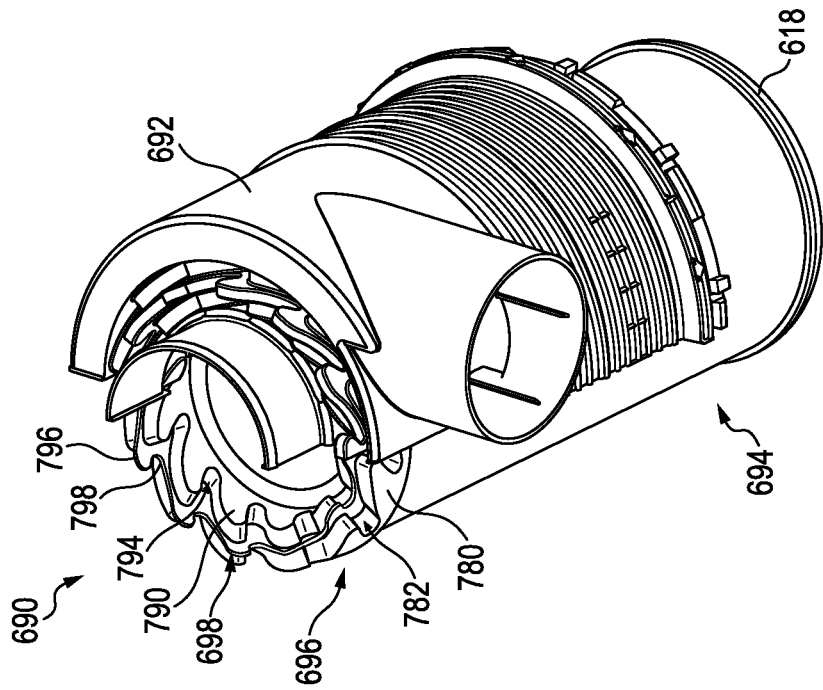
FIG. 6D is a top perspective view of a filter element with a filter seal member formed using a protective seal mold, according to yet another example embodiment.
Figure 6C:
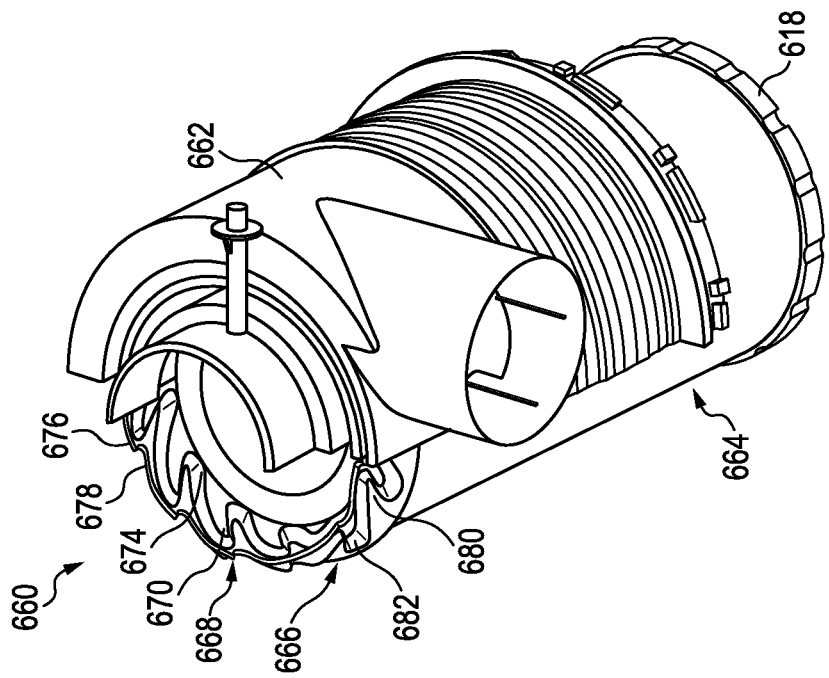
FIG. 6C is a top perspective view of a filter element with a filter seal member formed using a protective seal mold, according to yet another example embodiment.

FIG. 6C shows a top perspective view of a filter assembly 660 that includes a filter element 664 with an endplate 618 and a filter seal member 666 installed within a complementary housing 662, according to an example embodiment. The filter seal member 666 may be formed using a protective seal mold similar to the protective seal mold 102 of FIG. 1B, the protective seal mold 202 of FIG. 2A, and or the protective seal mold 102 of FIG. 5C. The filter seal member 666 includes an outer plurality of lobes 680 and the outer plurality of guide channels 682 configured to form an external seal when installed within the complementary housing 662 and an inner plurality of lobes 670 and an inner plurality of guide channels 674 configured to form an internal seal when installed within the complementary housing 662. The inner plurality of guide channels 674 are disposed between the inner plurality of lobes 670, and the outer plurality of lobes 680 are disposed between the outer plurality of guide channels 682. A support ring 668 is integrally formed between the inner and outer seal of the filter seal member 666 as the support ring 668 was included in a mold support channel of the protective seal mold. The support ring 668 includes a plurality of support surfaces 676 and a plurality of hook openings 678. Each hook opening in the plurality of hook openings 678 is disposed between a pair of support surfaces in the plurality of support surfaces 676. In other words, each hook opening in the plurality of hook openings 678 extends from one support surface to another support surface in the plurality of support surfaces 676. The support ring 668 is configured to protect the filter seal member 666 pre-installation of the filter element 664 into the housing 662.

FIG. 6D shows a top perspective view of a filter assembly 690 that includes a filter element 694 with an endplate 618 and a filter seal member 696 installed within a complementary housing 662, according to an example embodiment. The filter seal member 696 may be formed using a protective seal mold sim similar to the protective seal mold 102 of FIG. 1B, the protective seal mold 202 of FIG. 2A, and or the protective seal mold 102 of FIG. 5C. The filter seal member 696 includes an outer plurality of lobes 780 and the outer plurality of guide channels 782 configured to form an external seal when installed within the complementary housing 692 and an inner plurality of lobes 790 and an inner plurality of guide channels 794 configured to form an internal seal when installed within the complementary housing 692. The inner plurality of guide channels 794 are disposed between the inner plurality of lobes 790, and the outer plurality of lobes 780 are disposed between the outer plurality of guide channels 782. A support ring 698 is integrally formed between the inner and outer seal of the filter seal member 696 as the support ring 698 was included in a mold support channel of the protective seal mold. The support ring 698 includes a plurality of support surfaces 796 and a plurality of hook openings 798. Each hook opening in the plurality of hook openings 798 is disposed between a pair of support surfaces in the plurality of support surfaces 796. In other words, each hook opening in the plurality of hook openings 798 extends from one support surface to another support surface in the plurality of support surfaces 796. The support ring 698 is configured to protect the filter seal member 666 pre-installation of the filter element 664 into the housing 662.

Closed Protective Seal Mold

In some embodiments, a closed protective seal mold 702 is used to form a filter seal member 740 on a filter element 700, as shown in FIG. 7. The closed protective seal mold 702 is similar to the protective seal mold 102. A difference between the closed protective seal mold 702 and the protective seal mold 202 is the closed central portion 734 instead of a central opening 234. Accordingly, like numbering is used to designate like parts between the closed protective seal mold 702 and the protective seal mold 202. Beneficially, the closed central portion 734 of the closed protective seal mold 702 is configured to maintain the internal cleanliness of the filter media 708 of the filter element 700 by blocking the central filter opening 706 of the filter element 700 during packaging, transport, and pre-installation of the filter element 700. In other words, the closed endplate 712 and the closed protective seal mold 702 on each end of the filter element 700 prevent access to the central portion of the filter element by debris and other contaminants. In some embodiments, the closed protective seal mold 702 may be formed using an injection mold technique that provides for uniform wall thickness. For example, the closed protective seal mold 702 may be an injection molded polypropylene tray. In other embodiments, the closed protective seal mold 702 may be formed using a vacuum formation technique. For example, the closed protective seal mold 702 may be a vacuum formed polypropylene tray. The closed protective seal mold 702 may be formed using plastic, aluminum, or similar materials.

The closed protective seal mold 702 includes a first mold end 750 and a second mold end 752 disposed axially away from the first mold end 750. The closed protective seal mold 702 includes an outer mold surface 754 and an inner mold surface 756 used to form an external seal 742 and an internal seal 744, respectively, on the filter element 700. A closed central portion 734 is formed within the inner mold surface 756, blocking the first mold end 750 from the second mold end 752. The outer mold surface 754 of the closed protective seal mold 702 includes an outer plurality of lobe molds 760 and an outer plurality of guide channel molds 764 disposed between each lobe mold in the outer plurality of lobe molds 760. The outer plurality of lobe molds 760 and the outer plurality of guide channel molds 764 are configured to form similar features on an external surface of an end of a filter element to form an external seal when installed within a complementary housing. The inner mold surface 756 of the closed protective seal mold 702 includes an inner plurality of lobe molds 710 and an inner plurality of guide channel molds 714 disposed between each lobe mold in the inner plurality of lobe molds 710. The inner plurality of lobe molds 710 and the inner plurality of guide channel molds 714 are configured to form similar features on an inner surface of an end of a filter element to form an inner seal when installed within a complementary housing. While the inner plurality of lobe molds 710 is shown as having an identical size and shape to the outer plurality of lobe molds 760, in some embodiments, the inner plurality of lobe molds 710 have different shapes, sizes, and/or configurations compared to the outer plurality of lobe molds 760. The plurality of lobe molds may be configured to have a wide range of lobes (e.g., 2-28) with various periodicity angles and non-parallel curved shapes, for example, and similar to the seals shown in FIGS. 12A&B. In some embodiments, the plurality of lobe molds may be parallel shapes.

Each guide channel mold in the plurality of guide channel molds 764 includes a hook opening 762 and a support surface 766. In some embodiments, the support surface 766 is disposed on the second mold end 752 above a peak 770 of a lobe mold in the plurality of lobe molds 760 and is substantially horizontal (e.g., parallel to the first mold end 750). For example, the hook opening 762 extends from one support surface 766 to a support surface of an adjacent guide channel mold in the plurality of guide channel molds 764. As shown in FIG. 7, the hook opening 762 has a rounded "check mark" structure flipped along a horizontal axis. In some embodiments, the hook opening 762 and the support surface 766 are identical in shape and orientation to a support ring that is integrated with the filter seal member and configured to provide a pre-cleaner sleeve with protection against undesired compression of the filter seal member. In some embodiments, the hook opening 762 and the support surface 766 form a saw-toothed, dorsal-shaped, or similar protruding feature that provides a lead-in and guidance for engaging a filter seal member (formed by the closed protective seal mold 702) of a filter element within a complementary housing. As will be appreciated, the filter seal member 740 may be formed with the closed protective seal mold 702 in a manner similar to the method outlined above with respect to the protective seal mold 102 of FIG. 1B, the protective seal mold 202 of FIGS. 3A-3F, and/or the protective seal mold and ring 590 of FIGS. 5A-5F. In some embodiments, a filter seal is formed on both ends of the filter element using a single or two protective seal molds.

Figure 8B:
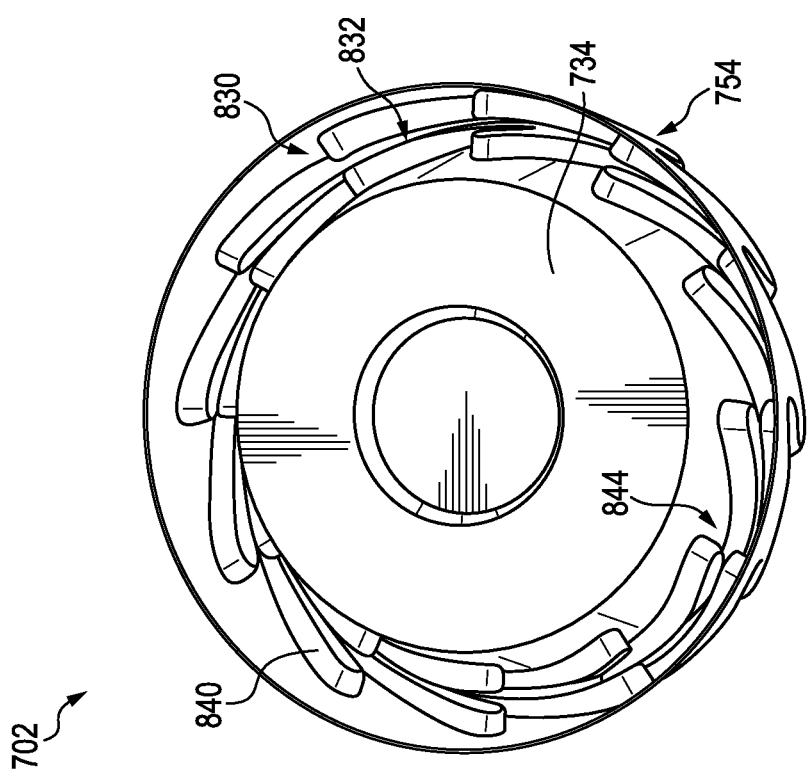
FIG. 8B is a top perspective view of the closed protective seal mold of FIG. 8A.
Figure 8A:
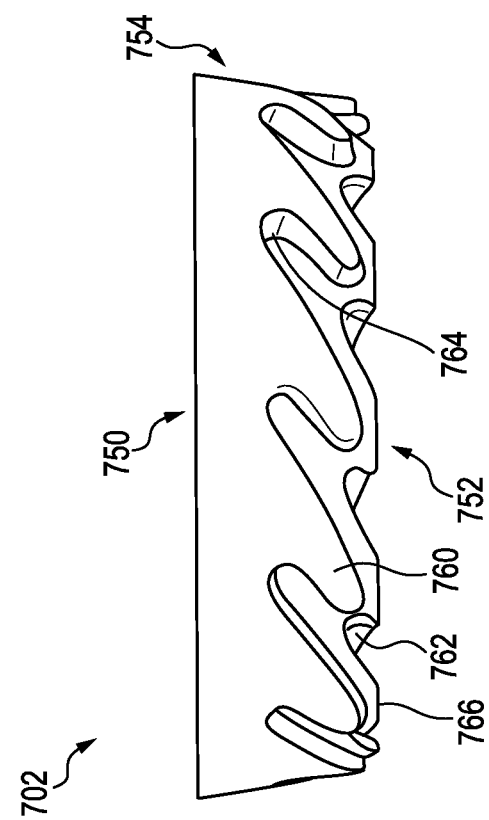
FIG. 8A is a side view of a closed protective seal mold for protecting and manufacturing a filter seal member for a filter element, according to an embodiment.

Referring to FIGS. 8A and 8B, perspective views of the closed protective seal mold 702 of FIG. 7 are shown. FIG. 8B shows a bottom perspective view of the closed protective seal mold 702 that includes the mold channel 830 that receives urethane, or a similar material) to form the filter seal member on an end of the filter element. An internal plurality of guide channel molds 844 (e.g., the inner plurality of guide channel molds 714 and the outer plurality of guide channels 764) are separated by a mold support channel 832. Similarly, an internal plurality of lobe molds 840 (e.g., the inner plurality of lobe molds 710 and the outer plurality of lobe molds 760) are separated by the mold support channel 832. The mold support channel 832 is configured to receive a support ring 800 that is formed with the filter seal member 740 to secure urethane and keep the shape of the filter seal member 740 during formation and to protect the filter seal member 740 prior to installation of the filter element 700 with a housing.

The closed protective seal mold 702 may include a support ring 800 that is integrated with the filter seal member 740. The support ring 800 may be mechanically attached to the filter seal member and retained on the filter to protect the filter seal member 740 and filter seal member material during packaging, transport, and installation of the filter element into a complementary housing. As will be appreciated, the support ring 800 may provide protection against filter seal member compromise such that the protective seal mold 702 is not needed to protect the filter seal member pre-installation. Beneficially, the support ring 800 is configured to be not interfere with the filter seal member and to allow for the filter element to be properly installed (e.g., form a seal) within the housing.

Figure 8D:
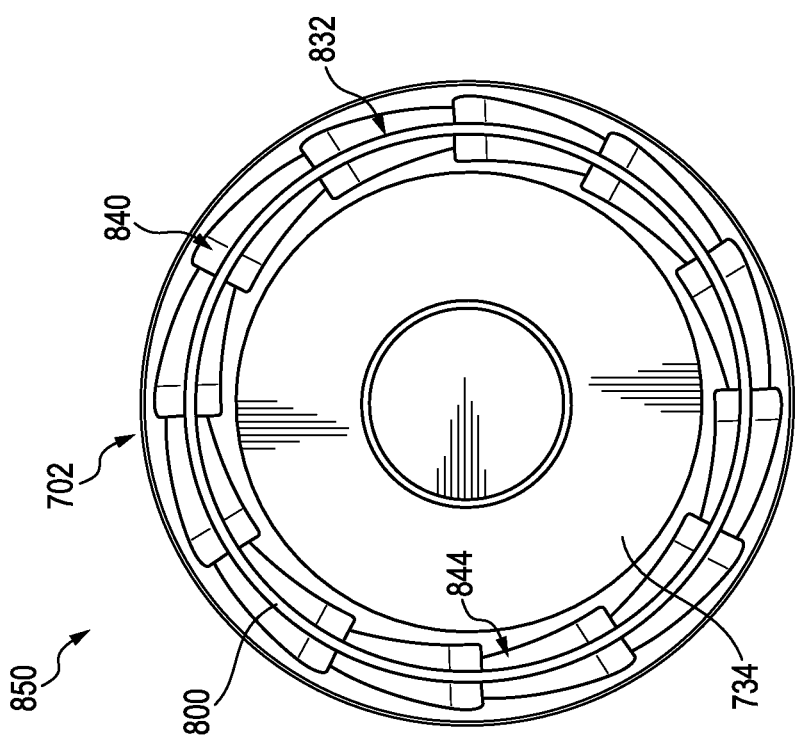
FIG. 8D is a top view of the support ring of FIG. 8C implemented with the closed protective seal mold of FIGS. 8A and 8B, according to an embodiment
Figure 8C:
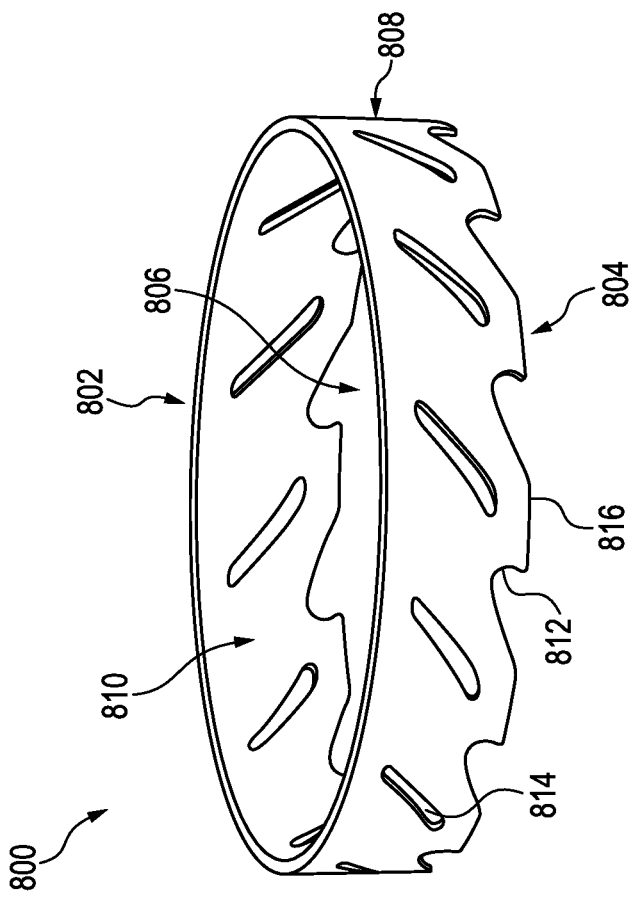
FIG. 8C is a perspective view of a support ring that may be implemented with the protective seal mold of FIG. 8A, according to an example embodiment.

As shown in FIG. 8C, the support ring 800 includes a first ring end 802, a second ring end 804, and a central ring opening 806. An internal ring surface 810 and an external ring surface 808 are disposed between the first ring end 802 and the second ring end 804. A plurality of ring openings 814 are formed along the internal ring surface 810 and external ring surface 808. The plurality of ring openings 814 are configured to allow for the filter seal member material (e.g., urethane foam) to form through portions of the support ring 800 and retain the support ring 800 within the filter seal member 740. The second ring end 804 includes a plurality of support surfaces 816 and a plurality of hook openings 812. The plurality of support surfaces 816 and the plurality of hook openings 812 are configured to be inserted into the mold support channel 832 of the closed protective seal mold 702 and rotated to engage the internal plurality of guide channel molds 244 and each hook opening 762 and each support surface 766. Each hook opening in the plurality of hook openings 812 is disposed between a pair of support surfaces in the plurality of support surfaces 816. In other words, each hook opening in the plurality of hook openings 812 extends from one support surface to another support surface in the plurality of support surfaces 816. In some embodiments, the hook openings 812 have a shape similar to a rounded "check mark" structure flipped along a horizontal axis.

Turning to FIG. 8D, a bottom plan view of the closed protective seal mold and ring 850 is shown. The closed protective seal mold and ring 850 includes the support ring 800 disposed within the closed protective seal mold 702. The plurality of support surfaces 816 and the plurality of hook openings 812 of the support ring 800 are inserted into the mold support channel 832 of the closed protective seal mold 702 and rotated to engage the internal plurality of guide channel molds 844 and each hook opening 762 and each support surface 766 to form the protective seal mold and ring 850. In some embodiments, the plurality of support surfaces 816 and the plurality of hook openings 812 form a saw-toothed, dorsal-shaped, or similar protruding feature that provides a lead-in and guidance for engaging a filter seal member 740 (formed by the closed protective seal mold 702) of a filter element within a complementary housing.

Figure 9C:
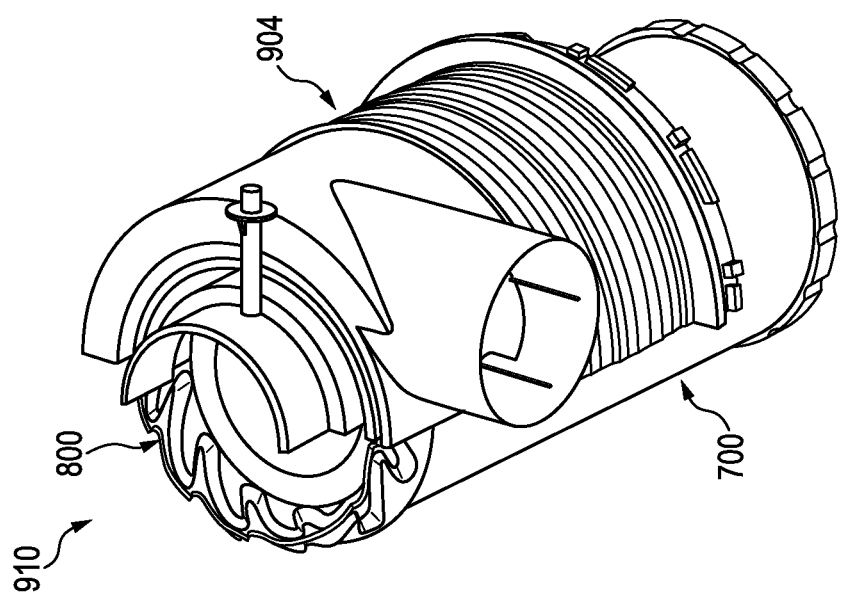
FIGS. 9A-9C show views of transporting, removing and installing a filter element with a filter seal member formed using a closed protective seal mold, according to yet another example embodiment.
Figure 9B:
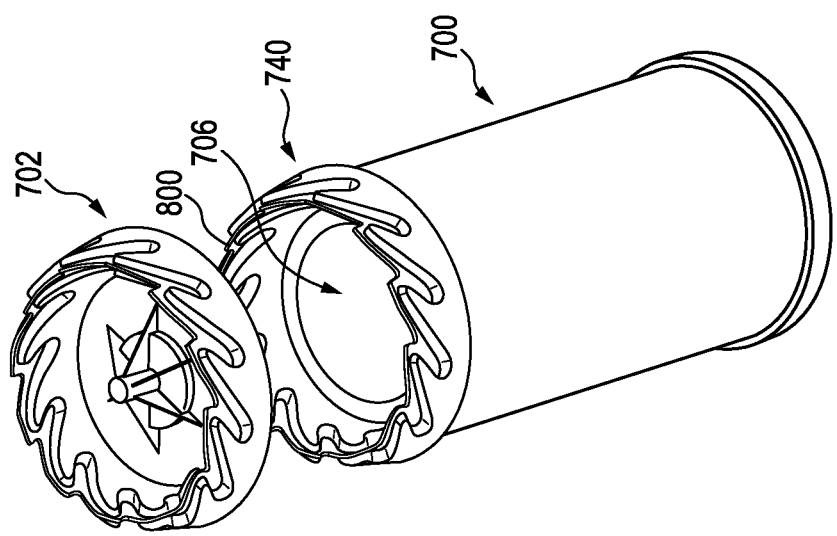
Figure 9A:
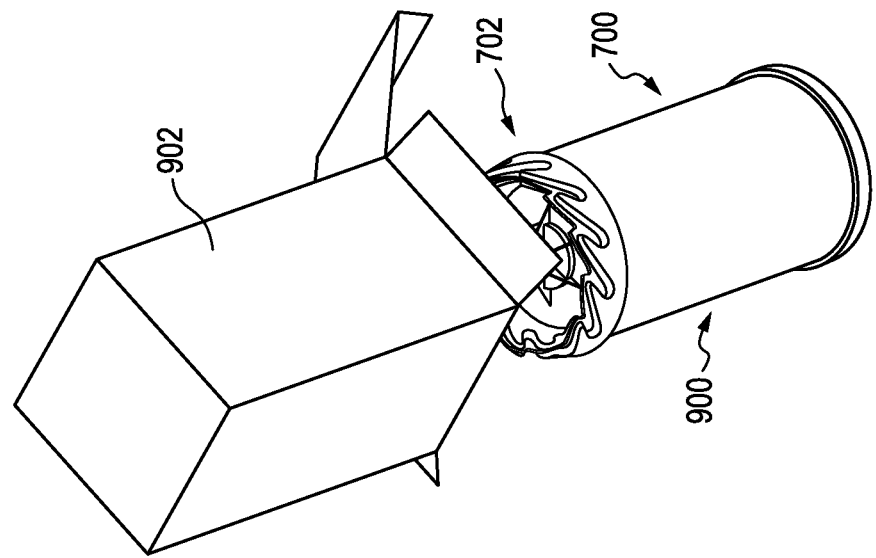

FIG. 9A shows a perspective view of packaging a protected filter element 900 into a shipping container 902 (e.g., box). The protected filter element 900 includes the filter element 700 with filter seal member 740 that is protected by the closed protective seal mold 702. As is readily apparent, the closed protective seal mold 702 impedes contact of the filter seal member 740 with portions of the shipping container 902 as well as prevents contamination and debris from traveling internally of the filter element 700. FIG. 9B shows the removal of the closed protective seal mold 702 from the filter element 700, exposing the filter seal member 740 and the central filter opening 706. Specifically, the closed protective seal mold 702 is rotated to "unlock" the lobe molds and guide channel molds of the closed protective seal mold 702 from the lobe and guide channels of the filter seal member 740 and then the closed protective seal mold 702 is removed. FIG. 9C shows the installation of the filter element 700 into a complementary housing 904 to form a filtration assembly 910. Notably, the support ring 800 provides protection against over compression or compromise of the filter seal member 740 during the installation process. As will be appreciated, the closed protective seal mold 702 may have, and may form similar filter seal member portions, and a wide variety of shapes including the dorsal-shaped structure of FIGS. 1A-1C, the substantially straight structure of FIGS. 6A & 6B, or other curved, non-parallel shapes. In some embodiments, the filter seal member portions may include parallel shapes.

Filter Seal Member Configurations

FIGS. 10A-10D show a side view of filter elements having a different filter seal member configurations on an end of the filter element. FIGS. 11A-11D show a perspective view of FIGS. 10-10D, respectively. Referring to FIGS. 10A and 11A, a filter element 1000 is shown having a closed endplate 1014 and a filter seal member 1002 formed using a protective seal mold. The filter seal member 1002 includes an external seal 1004, an internal seal 1006, and a support ring 1008. The filter seal member 1002 has a seal radius 1012 substantially equal to the endplate radius 1010. Referring to FIGS. 10B and 11B, a filter element 1020 is shown having a closed endplate 1034 and a filter seal member 1022 formed using a protective seal mold. The filter seal member 1022 includes an external seal 1024 and a support ring 1028. The filter seal member 1022 has a seal radius 1032 substantially equal to the endplate radius 1030. Referring to FIGS. 10C and 11C, a filter element 1040 is shown having a closed endplate 1054 and a filter seal member 1042 formed using a protective seal mold. The filter seal member 1042 includes an external seal 1044 and a support ring 1048. The filter seal member 1042 has a seal radius 1052 that is greater than the endplate radius 1050. Referring to FIGS. 10D and 11D, a filter element 1060 is shown having a closed endplate 1074 and a filter seal member 1062 formed using a protective seal mold. The filter seal member 1062 includes an internal seal 1066 and a support ring 1068. The filter seal member 1062 has a seal radius 1072 that is equal to the endplate radius 1070 (in part due to the lack of an external seal). As will be appreciated, the protective seal mold can be altered and configured to generate a wide variety of filter seal member elements. While the filter seal members are shown on one end of the respective filter elements, the filter seal members may be disposed on both sides of the filter element.

Figure 12A:
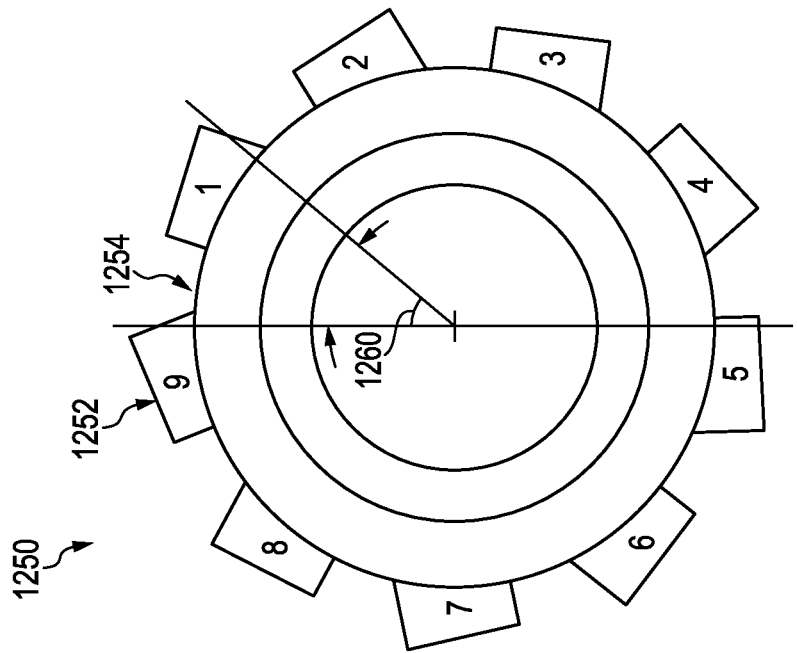
FIG. 12A shows a top view of an eighteen lobed non-parallel, curved filter seal member formed using a protective seal mold, according to another embodiment.
Figure 12B:
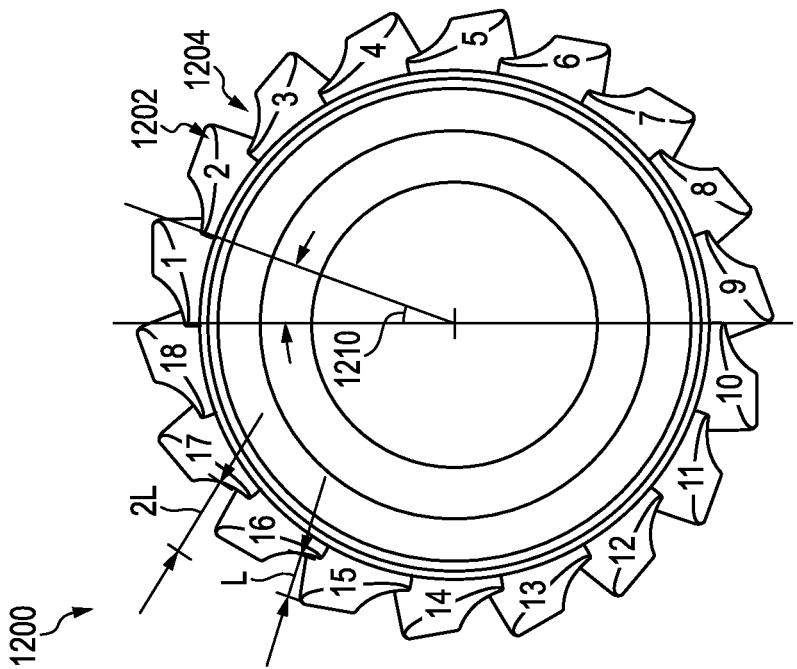
FIG. 12B shows a top view of a nine lobed non-parallel, curved filter seal member formed using a protective seal mold, according to yet another embodiment.

Turning to FIG. 12A, a filter seal member 1200 formed using a protective seal mold is shown, according to an example embodiments. The filter seal member includes a plurality of lobes 1202 and a plurality of guide channels 1204. Each of the lobes in the plurality of lobes are separated by a periodicity angle 1210 that is associated with the number of lobes in the plurality of lobes 1202. As shown in FIG. 12A, the filter seal member includes eighteen lobes in the plurality of lobes 1202 and has a periodicity angle of twenty-degrees. Referring to FIG. 12B, a filter seal member 1250 formed using a protective seal mold is shown, according to an example embodiment. The filter seal member includes a plurality of lobes 1252 and a plurality of guide channels 1254. Each of the lobes in the plurality of lobes are separated by a periodicity angle 1260 that is associated with the number of lobes in the plurality of lobes 1252. As shown in FIG. 12B, the filter seal member includes nine lobes in the plurality of lobes 1252 and has a periodicity angle of forty-degrees. As will be appreciated, filter seal members having lobes of 1, 2, 3, 4, 5, 6, 8, 10, 12, 15, 18, 20, 24, 30, 36, 48, 60, 72, 90, 100, 120, 190, or 360 lobes may be implemented having periodicity angles of 360, 180, 120, 90, 72, 60, 45, 36, 30, 24, 20, 18, 15, 12, 10, 7.5, 6, 5, 4, 3.6, 3, and 1-degrees, respectively. Other numbers of lobes (and periodicity angles) are also possible. As will be readily apparent, any change to the number, shape, location, angle, etc. of the lobes of the filter seal member will result in a change to the number, shape, location, angle, of mold lobes in the protective seal mold. In some embodiments, the filter seal member is disposed on both ends of the filter element.

It is understood that the various components, configurations, and features of the different embodiments of the filter seal member and/or protective seal mold may be combined according to the desired use and configuration.

The term "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, unless otherwise specifically noted, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter seal member mold comprising:
   a first mold end;
   a second mold end disposed axially away from the first mold end;
   a first mold surface disposed between the first mold end and the second mold end, the first mold surface comprising a first plurality of lobe molds and at least one guide channel mold, each lobe mold in the first plurality of lobe molds has a substantially dorsal shape, the first plurality of lobe molds configured to form at least one lobe on an end of a filter element and the at least one guide channel mold configured to form at least one guide channel on the end of the filter element;
   a second mold surface disposed between the first mold end and the second mold end and disposed radially away from the first mold surface; and
   a mold channel formed between the first mold surface and the second mold surface, the mold channel comprising a closed portion adjacent the first mold end and an open portion adjacent the second mold end, the mold channel configured to receive the end of the filter element and form a filter seal member on the filter element.

2. The filter seal member mold of claim 1, wherein the at least one guide channel mold is a plurality of guide channel molds, each guide channel mold in the plurality of guide channel molds disposed between a pair of lobe molds in the plurality of lobe molds.

3. The filter seal member mold of claim 2, wherein the plurality of guide channel molds is a first plurality of guide channel molds, further comprising a second plurality of lobe molds disposed on the second mold surface and a second plurality of guide channel molds disposed on the second mold surface, each guide channel mold in the second plurality of guide channel molds disposed between a pair of lobe molds in the second plurality of lobe molds.

4. The filter seal member mold of claim 3, wherein each lobe in the first plurality of lobe molds is aligned with a corresponding lobe in the second plurality of lobe molds.

5. The filter seal member mold of claim 3, wherein each lobe mold in the second plurality of lobe molds has a substantially dorsal shape.

6. The filter seal member mold of claim 1, wherein each lobe in the first plurality of lobe molds is parallel to an adjacent lobe in the plurality of lobe molds.

7. The filter seal member mold of claim 1, wherein the second mold surface is disposed radially inward from the first mold surface.

8. The filter seal member mold of claim 1, wherein the first mold surface is disposed radially inward from the second mold surface.

9. The filter seal member mold of claim 1, further comprising a support ring disposed within the mold channel, the support ring retained on the filter seal member when the filter element is removed from the filter seal member mold, the support ring configured to impede compression of the filter seal member.

10. The filter seal member mold of claim 9, wherein lobe mold is a first plurality of lobe molds and the at least one guide channel mold is a first plurality of guide channel molds, further comprising a second plurality of lobe molds disposed on the second mold surface and a second plurality of guide channel molds disposed on the second mold surface, wherein the support ring is disposed between the first plurality of lobe molds and the second plurality of lobe molds, each guide channel mold in the first plurality of guide channel molds disposed between a pair of lobe molds in the first plurality of lobe molds, and each guide channel mold in the second plurality of guide channel molds disposed between a pair of lobe molds in the second plurality of lobe molds.

11. The filter seal member mold of claim 10, wherein the support ring comprises:
a first ring end;
a second ring end disposed axially away from the first ring end;
a first ring surface disposed between the first ring end and the second ring end;
a second ring surface disposed radially away from the first ring surface; and
a plurality of support surfaces along the second ring end, each support surface in the plurality of support surfaces disposed above a lobe in the first plurality of lobe molds.

12. The filter seal member mold of claim 11, wherein the support ring further comprises a plurality of openings formed along the first ring surface and second ring surface adjacent the first ring end, the plurality of ring openings configured to allow for material to form through portions of the support ring and retain the support ring within the filter seal member.

13. The filter seal member mold of claim 11, wherein each support surface in the plurality of support surfaces has a substantially dorsal shape.

14. The filter seal member mold of claim 1, further comprising a mold opening formed between the first mold end and the second mold end, the mold opening disposed radially inward of the mold channel.

15. The filter seal member mold of claim 14, wherein the mold channel comprises a plurality of support surfaces and a plurality of hook openings adjacent the first mold end, each hook opening in the plurality of hook openings extending from one support surface to another support surface in the plurality of support surfaces, plurality of support surfaces and a plurality of hook openings form a plurality of seal support surfaces and a plurality of seal hook openings on the filter seal member on the filter element.

16. A method of forming a filter seal member on a filter element, the method comprising:
providing a filter media comprising a first filter media end and a second filter media end axially disposed from the first filter media end;
securing an endplate to the first filter media end;
providing a filter seal member mold, the seal member mold comprising a first mold end, a second mold end disposed axially away from the first mold end, a first mold surface comprising a plurality of lobe molds, each lobe mold in the plurality of lobe modes has a substantially dorsal shape, the first mold surface disposed between the first mold end and the second mold end, a second mold surface disposed between the first mold end and the second mold end and disposed radially away from the first mold surface, and a mold channel formed between the first mold surface and the second mold surface, the mold channel comprising a closed portion adjacent the first mold end and an open portion adjacent the second mold end, and wherein the first mold surface comprises at least one lobe mold and at least one guide channel mold;
dispensing a filter seal material into the mold channel; and
inserting the second filter media end into the mold channel to form the filter seal member on the second filter media end, the filter seal member comprising at least one guide channel formed by the at least one guide channel mold.

17. A filter element comprising:
a first filter end;
a second filter end disposed axially away from the first filter end;
filter media disposed between the first filter end and the second filter end;
a filter seal member formed on the first filter end, the filter seal member comprising a first lobe, a second lobe, and a guide channel, the guide channel disposed between the first lobe and the second lobe, the first lobe being non-parallel to the second lobe.

18. The filter element of claim 17, wherein the filter seal member further comprises a support ring protruding axially from the filter seal member away from the second filter end, the support ring comprising a ring lobe, the ring lobe disposed axially above the first lobe and configured to impede compression of the filter seal member.

19. The filter element of claim 17, wherein the first lobe and the second lobe are a plurality of lobes, and the guide channel is one of a plurality of guide channels, each guide channel in the plurality of guide channels disposed between a pair of lobes in the plurality of lobes.

20. The filter element of claim 19, further comprising a support ring protruding axially from the filter seal member away from the second filter end, the support ring comprising a plurality of support surfaces and a plurality of hook openings, each hook opening in the plurality of hook openings extending from one support surface to another support surface in the plurality of support surfaces.

21. A filter seal member mold comprising:
a first mold end;
a second mold end disposed axially away from the first mold end;

a first mold surface disposed between the first mold end and the second mold end, the first mold surface comprising at least one lobe mold and at least one guide channel mold, the at least one lobe mold configured to form at least one lobe on an end of a filter element and the at least one guide channel mold configured to form at least one guide channel on the end of the filter element;

a second mold surface disposed between the first mold end and the second mold end and disposed radially away from the first mold surface;

a mold channel formed between the first mold surface and the second mold surface, the mold channel comprising a closed portion adjacent the first mold end and an open portion adjacent the second mold end, the mold channel configured to receive the end of the filter element and form a filter seal member on the filter element; and a support ring disposed within the mold channel, the support ring retained on the filter seal member when the filter element is removed from the filter seal member mold, the support ring configured to impede compression of the filter seal member, wherein lobe mold is a first plurality of lobe molds and the at least one guide channel mold is a first plurality of guide channel molds, further comprising a second plurality of lobe molds disposed on the second mold surface and a second plurality of guide channel molds disposed on the second mold surface, wherein the support ring is disposed between the first plurality of lobe molds and the second plurality of lobe molds, each guide channel mold in the first plurality of guide channel molds disposed between a pair of lobe molds in the first plurality of lobe molds, and each guide channel mold in the second plurality of guide channel molds disposed between a pair of lobe molds in the second plurality of lobe molds.

22. The filter seal member mold of claim 21, wherein the support ring comprises:

a first ring end;

a second ring end disposed axially away from the first ring end;

a first ring surface disposed between the first ring end and the second ring end;

a second ring surface disposed radially away from the first ring surface; and a plurality of support surfaces along the second ring end, each support surface in the plurality of support surfaces disposed above a lobe in the first plurality of lobe molds.

23. The filter seal member mold of claim 22, wherein the support ring further comprises a plurality of openings formed along the first ring surface and second ring surface adjacent the first ring end, the plurality of ring openings configured to allow for material to form through portions of the support ring and retain the support ring within the filter seal member.

24. The filter seal member mold of claim 22, wherein each support surface in the plurality of support surfaces has a substantially dorsal shape.

25. A filter seal member mold comprising:

a first mold end;

a second mold end disposed axially away from the first mold end;

a first mold surface disposed between the first mold end and the second mold end, the first mold surface comprising at least one lobe mold and at least one guide channel mold, the at least one lobe mold configured to form at least one lobe on an end of a filter element and the at least one guide channel mold configured to form at least one guide channel on the end of the filter element;

a second mold surface disposed between the first mold end and the second mold end and disposed radially away from the first mold surface;

a mold channel formed between the first mold surface and the second mold surface, the mold channel comprising a closed portion adjacent the first mold end and an open portion adjacent the second mold end, the mold channel configured to receive the end of the filter element and form a filter seal member on the filter element; and a mold opening formed between the first mold end and the second mold end, the mold opening disposed radially inward of the mold channel, wherein the mold channel comprises a plurality of support surfaces and a plurality of hook openings adjacent the first mold end, each hook opening in the plurality of hook openings extending from one support surface to another support surface in the plurality of support surfaces, plurality of support surfaces and a plurality of hook openings form a plurality of seal support surfaces and a plurality of seal hook openings on the filter seal member on the filter element.

* * * * *